US005600646A

United States Patent [19]
Polomski

[11] Patent Number: 5,600,646
[45] Date of Patent: Feb. 4, 1997

[54] VIDEO TELECONFERENCING SYSTEM WITH DIGITAL TRANSCODING

[75] Inventor: Mark D. Polomski, Hollis, N.H.

[73] Assignee: VideoServer, Inc., Lexington, Mass.

[21] Appl. No.: 379,274

[22] Filed: Jan. 27, 1995

[51] Int. Cl.$^6$ ................................. H04J 3/22; H04N 7/15
[52] U.S. Cl. ........................... 370/263; 370/402; 348/15; 348/17; 348/552
[58] Field of Search .............................. 370/62, 84, 118, 370/58.1, 85.1, 85.9, 85.13, 79, 99, 110.1; 348/15, 16, 14, 17, 384, 403, 404, 552; 379/202, 158; 381/29, 30

[56] References Cited

U.S. PATENT DOCUMENTS

| | | | |
|---|---|---|---|
| 4,479,195 | 10/1984 | Herr et al. | 364/900 |
| 4,650,929 | 3/1987 | Boerger et al. | 358/86 |
| 4,748,618 | 5/1988 | Brown et al. | 370/94 |
| 4,965,819 | 10/1990 | Kannes | 379/53 |
| 4,995,071 | 2/1991 | Weber et al. | 379/53 |
| 5,072,442 | 12/1991 | Todd | 370/62 |
| 5,253,056 | 10/1993 | Puri et al. | 358/133 |
| 5,315,633 | 5/1994 | Champa | 348/16 |
| 5,357,511 | 10/1994 | DiNapoli et al. | 370/62 |
| 5,382,972 | 1/1995 | Kannes | 348/15 |
| 5,392,223 | 2/1995 | Caci | 348/17 |
| 5,392,284 | 2/1995 | Sugiyama | 370/84 |
| 5,408,274 | 4/1995 | Chang | 348/700 |
| 5,416,520 | 5/1995 | Kuzma | 348/384 |
| 5,446,491 | 8/1995 | Shibato et al. | 348/15 |
| 5,871,544 | 12/1994 | Jacquin et al. | 348/422 |

OTHER PUBLICATIONS

Gharavi, H. and Partovi, M. H., "Video Coding and Distribution Over ATM for Multipoint Teleconferencing," *IEEE*, pp. 1–7 (Nov. 29, 1993).

Horn, D. N. et al., "A Standards–Based Multimedia Conferencing Bridge," *AT& T Technical Journal*, pp. 41–49 (Jan./Feb. 1993).

"Video Codec Chip Set Provides MPEG, p*64, and JPEG Compliance," *Electrical Design News*, vol. 37, No. 9, pp. 103–104 (Apr. 23, 1992).

Krause, R., "Indeo, H.320 Silicon Pursued," *Electronic News*, vol. 40, No. 2023, (Jul. 18, 1994).

Morrison, D. G., et al., "Reduction of the Bit–Rate of Compressed Video While in its Coded Form," Sixth International Workshop on Packet Video, U.S.A., (1994, Sep.).

Morrison, D. G., "Low delay Video Transcoder for Multimedia Interworking," First International Workshop on Mobile Multimedia Communications, Tokyo, (1993, Dec.).

(List continued on next page.)

*Primary Examiner*—Alpus H. Hsu
*Assistant Examiner*—Seema S. Rao
*Attorney, Agent, or Firm*—Hamilton, Brook, Smith & Reynolds, P.C.

[57] ABSTRACT

A video teleconferencing system uses digital transcoding to obtain algorithm transcoding, transmission rate matching, and spatial mixing. The video teleconferencing system comprises a multipoint control unit (MCU) for allowing multiple audiovisual terminals, which send and receive compressed digital data signals, to communicate with each other in a conference. The MCU has a video processing unit (VPU) that performs algorithm transcoding, rate matching, and spatial mixing among the terminals within a conference. The VPU includes a time division multiplex pixel bus and a plurality of processors. Each processor is assignable to an audiovisual terminal in the conference and is coupled to the pixel bus. In a receive mode, each processor receives and decodes compressed video signals from its assigned terminal and puts the decoded signal onto the pixel bus. In a transmit mode, each processor receives from the pixel bus uncompressed video signals from any terminal in the conference. The uncompressed video signals are processed and encoded for transmission to the respective assigned terminal. Video encoding time due to motion displacement search is reduced by passing displacement information from the compressed video signals to the encoder to be used directly or as a seed for further refinements of the motion displacement field.

31 Claims, 23 Drawing Sheets

OTHER PUBLICATIONS

Botzko, S., "Continuous Presence for H.320 Multipoint Conferences," Contribution to T1A1.5 Committee (Nov. 4, 1993).

Chen, T. C., et al., "Continuous Presence Video Bridging Based on H.261 Standard," *SPIE* vol. 2094, pp. 269–280, Visual Comm. and Image Processing '93, (Nov. 8–11, 1993).

VIDEO TELECONFERENCING SYSTEM WITH DIGITAL TRANSCODING

BACKGROUND OF THE INVENTION

Video teleconferencing systems allow for simultaneous exchange of audio, video and data information among multiple audiovisual terminals. Systems known as multipoint control units (MCUs) perform switching functions to allow three or more audiovisual terminals to intercommunicate in a conference. The central function of an MCU is to link multiple video teleconferencing sites together by receiving frames of digital signals from audiovisual terminals, processing the received signals, and retransmitting the processed signals to appropriate audiovisual terminals as frames of digital signals. The digital signals can include audio, video, data and control information. Video signals from two or more audiovisual terminals can be spatially mixed to form a composite video signal for viewing by teleconference participants.

Advances in digital communications have led to the proliferation of digital audiovisual terminals with codecs employing data compression. The Telecommunications Standardization Sector (TSS) of the International Telecommunication Union has specified a series of recommendations for video teleconferencing known as the H-Series. The H-Series includes H.221 defining frame structure, H.261 defining video coding and decoding, H.231 defining multipoint control units, and H.320 defining audiovisual terminals. Standards-based compression algorithms (e.g., H.261) are becoming widespread. However, there are many proprietary algorithms for which better quality or compression rates are claimed. It is, therefore, desirable to connect terminals having incompatible compression algorithms. The typical MCU can support multiple conferences in which separate conferences can have different video compression algorithms, audio encoding algorithms, transmission rates, and protocols. Unfortunately, because the hardware characteristics of the audiovisual terminals are typically different from one another (transmission rate, compression algorithm, protocol or resolution), it has not usually been possible to interconnect different audiovisual terminals in a single conference. Because of these limitations, subscribers have been faced with the costly task of installing multiple types of equipment associated with different compression algorithms or transmission rates.

Network based services offered by interexchange carriers exist that allow transcoding between different compression algorithms of audiovisual terminals in a conference. These known transcoding services operate by first decoding compressed signals from each audiovisual terminal according to its respective compression algorithm and then converting the resultant uncompressed signals into analog signals. For example, the analog signal produced from a terminal A having coding algorithm X may be encoded by an algorithm Y associated with terminal B, thus achieving transcoding between unlike terminals A and B. Such an analog transcoding scheme can also be used for matching transmission rates between different codecs.

SUMMARY OF INVENTION

A disadvantage of analog transcoding is signal degradation due to multiple analog to digital conversions. Spatial mixing of video signals from audiovisual terminals having different transmission rates and resolutions results in a composite video signal at the lowest common resolution. The foregoing problems are solved by a video teleconferencing system having a processor arrangement for performing algorithm transcoding and transmission rate matching of digital video signals from dissimilar audiovisual terminals.

A multipoint control unit receives compressed video signals from audiovisual terminals and transmits selected compressed video signals to the audiovisual terminals. The MCU comprises decoding means for decoding the compressed video signals from respective terminals and a time division multiplex bus receiving decoded video signals at timeslots associated with respective terminals. The MCU includes selector means for selecting decoded video signals from timeslots of the time division multiplex bus for encoding by encoding means for transmission to respective terminals.

Accordingly, in a preferred embodiment, the video teleconferencing system comprises a multipoint control unit (MCU) for allowing a plurality of audiovisual terminals, which send and receive compressed digital data signals, to communicate with each other in a conference. The MCU includes a video processing unit (VPU) which performs algorithm transcoding and transmission rate matching among the audiovisual terminals within a conference. The VPU comprises a time division multiplex pixel bus, a pixel bus controller and a plurality of processors. The pixel bus has a plurality of timeslots for transporting uncompressed video signals. Each processor, assignable to any audiovisual terminal in the conference, is coupled to the pixel bus and is associated with at least one timeslot.

In a receive mode, each processor receives and decodes compressed video signals from its assigned audiovisual terminal. The uncompressed video signals are then optionally scaled to a desirable resolution and inserted into at least one timeslot assigned to the processor.

In a transmit mode, each processor receives uncompressed video signals from any timeslot associated with any processor in the same conference. The uncompressed video signals are optionally scaled to a desirable resolution and then encoded for transmission to the audiovisual terminal assigned to the processor.

The pixel bus provides a point of flexibility for achieving algorithm transcoding and transmission rate matching. By decoding compressed video signals and placing the uncompressed video signals into timeslots on the pixel bus, the uncompressed video signals are made independent of their respective source terminal compression algorithms and are thus available for encoding according to any receiving terminal compression algorithm. Thus, the decoding and encoding at each processor may comprise a compression algorithm matching that of its respective assigned audiovisual terminal and the compression algorithms of the processors in the conference may differ. This aspect of the invention enables algorithm transcoding among audiovisual terminals.

According to another aspect of the present invention, each of the audiovisual terminals in a conference can operate at a different transmission rate. Each processor decodes compressed video signals at a data rate matching its assigned audiovisual terminal. The uncompressed video signals are placed into timeslots of the pixel bus and are available for encoding at different data rates matching respective receiving audiovisual terminals. Since the video signals on the pixel bus are uncompressed frames of video data, the loss of video frames with slow retrieval by a low rate processor on the one hand, or the repetition of video frames with rapid retrieval by a high rate processor on the other hand, does not interfere with the intelligibility of the video signals encoded for respective receiving terminals. Thus, each terminal receives video signals at the best image resolution for its associated data transmission rate.

In another aspect of the present invention, continuous presence is enabled whereby video signals from multiple conferencing sites are spatially mixed to form a composite signal. Accordingly, each processor further comprises means for spatially mixing a plurality of uncompressed video signals. Uncompressed video signals from multiple timeslots associated with multiple audiovisual terminals are taken from the pixel bus, encoded and tiled into a composite video signal for transmission to a respective assigned audiovisual terminal. The encoding of the composite video signal is at the data rate matching the respective assigned audiovisual terminal. Thus, even with spatial mixing, the system obtains the simultaneous viewing of participants at the highest possible data rates of respective audiovisual terminals in the conference.

According to a further aspect of the present invention, the portion of time required to re-encode a video stream due to motion displacement search is reduced by either reusing displacement information from the incoming compressed video stream for the motion compensation in the encoder, or as a seed for further refinements of the motion displacement field.

The above and other features of the invention including various novel details of construction and combinations of parts will now be more particularly described with reference to the accompanying drawings and pointed out in the claims. It will be understood that the particular video teleconferencing system embodying the invention is shown by way of illustration and not as a limitation of the invention. The principles and features of this invention may be employed in varied and numerous embodiments without departing from the scope of the invention.

DETAILED DESCRIPTION OF THE INVENTION

Figure 1:
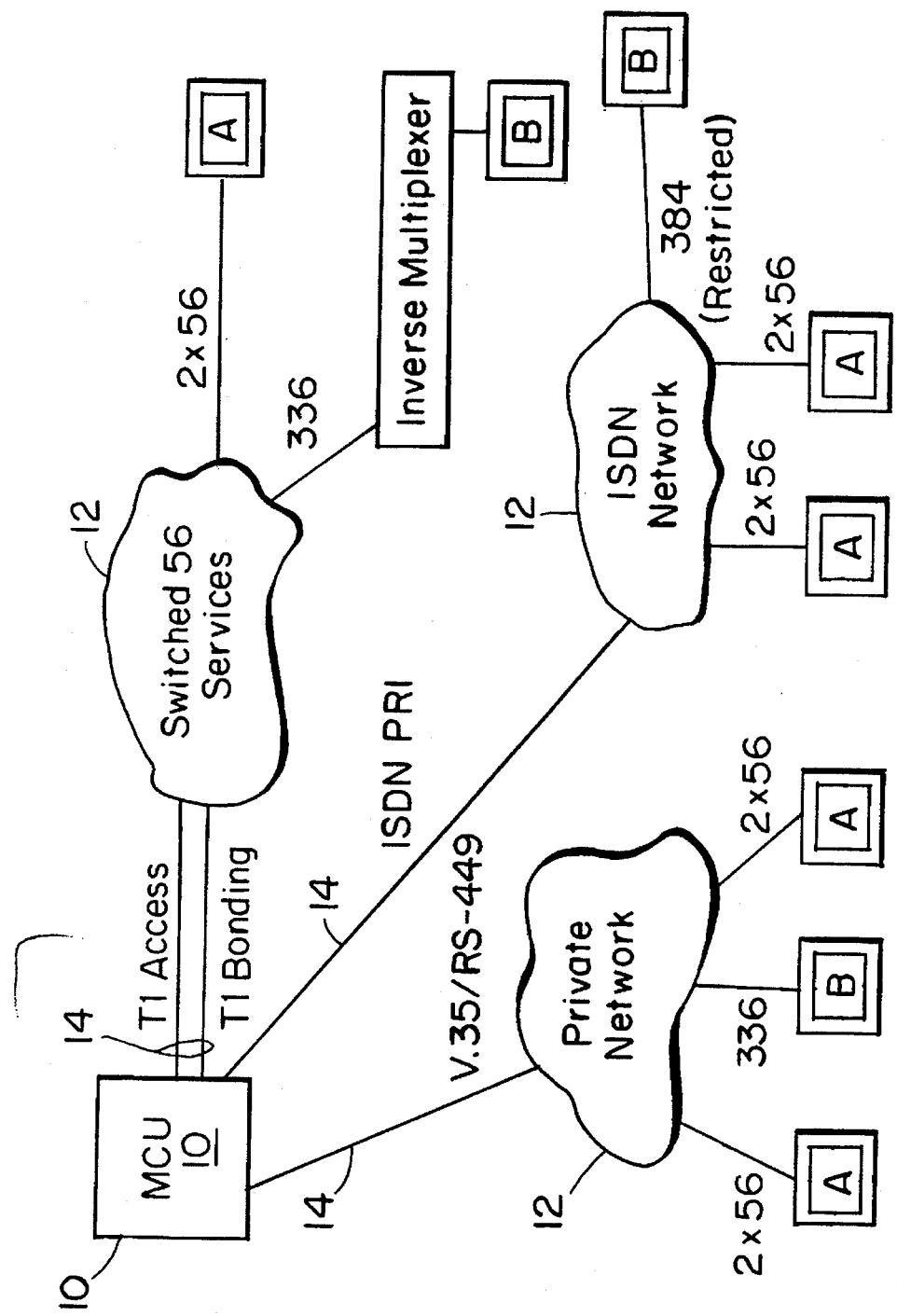
FIG. 1 diagrammatically illustrates a video teleconferencing system having multiple audiovisual terminals connected to an MCU through a variety of networks.

Referring to FIG. 1, a video teleconferencing system is shown in which audiovisual terminals A, B are connected to an MCU 10 through a variety of communications networks 12, each network having a particular type of access interface 14 to the MCU 10, e.g., V.35/RS-449 for private networks, PRI for ISDN networks, and T1 access for switched 56 networks. One conference consists of audiovisual terminals A operating at one data rate connected through their respective communications networks to the MCU 10 while another conference comprises audiovisual terminals B operating at another data rate similarly configured.

Figure 2:
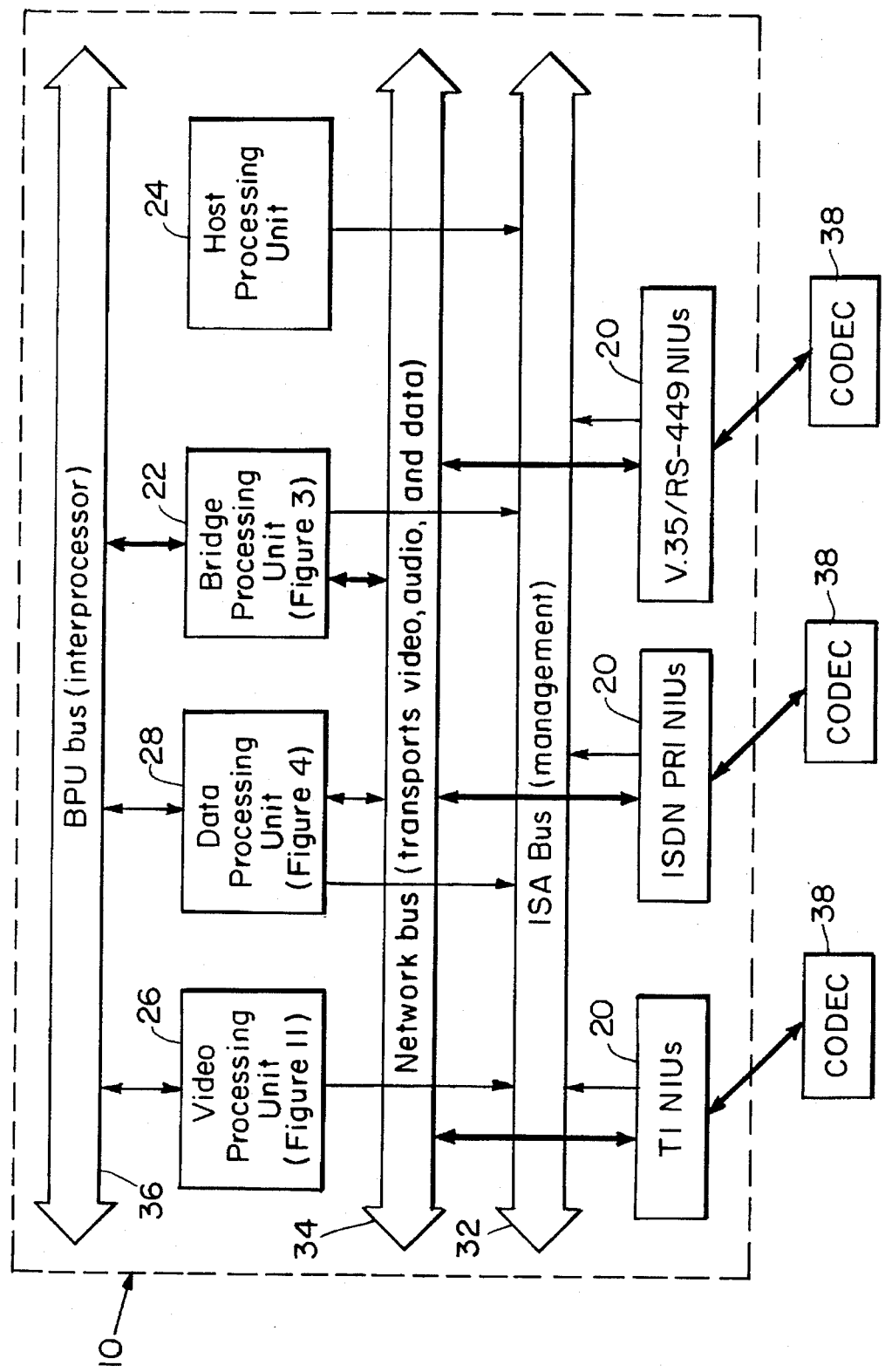
FIG. 2 is a block diagram of an MCU configuration.

FIG. 2 illustrates MCU 10 installed in a host 80386 or 80386-based PC. There are four major components in MCU 10: at least one Network Interface Unit (NIU) 20, at least one Bridge Processing Unit (BPU) 22, a Host Processing Unit (HPU) 24, and at least one Video Processing Unit (VPU) 26. In addition, MCU 10 supports optional Data Processing Unit (DPU) 28. Each of these components are digital devices for processing digital data. In addition to a host Industry Standard Architecture (ISA) bus 32, the MCU 10 includes a Network Bus 34 and a BPU Bus 36. The Network Bus 34 complies with the Multi-Vendor Integration Protocol (MVIP) while the BPU Bus 36 is a derivative of the MVIP specification. External audiovisual terminals, or codecs 38, connect to the MCU 10 to form conferences.

The MCU operation will now be described at a high-level with respect to FIG. 2. Each codec 38, typically an H.320 audiovisual terminal, connects to the MCU 10 through a communications network. Unsynchronized digital data frames from each codec 38 are made available on the Network bus 34 through NIUs 20. The BPUs 22 process the unsynchronized data frames from the Network Bus 34 to produce data frames aligned on an octet boundary which are made available to other BPUs 22 on the BPU bus 36. The BPUs 22 also extract audio information from the data frames. The audio information is decoded to PCM data and made available on the BPU bus 36 for mixing with audio from other codecs 38 by respective BPUs 22 in a conference. The BPUs 22 combine compressed video information and mixed encoded audio information into frames which are placed on the Network Bus 34 for transmission to respective codecs 38. The optional DPU 28 performs processing functions similar to the BPUs 22 to support audiovisual terminals having PCS (Intel) codecs.

In a standard conference, the BPUs 22 perform video switching within a conference by selecting video data frames from timeslots on the BPU bus 36 and routing the frames to respective codecs 38 in the conference. A particular BPU 22 selects the appropriate video data frames based upon an MCU conference selection process. Typically, the selection process is based upon a comparison of the voice levels of the conference locations. The loudest conference location is designated the current broadcaster to be viewed by all other conference locations while the current broadcaster typically views another location. In alternative conference selection processes, an MCU operator or a particular audiovisual terminal operating in a chair control mode selects a location as the current broadcaster.

In cases where the audiovisual terminals operate at different transmission rates or with different compression algorithms or are to be mixed into a common image, the video data is further processed by the VPUs 26 before it returns through the BPUs. As will be discussed in detail below, the VPUs 26 extract compressed video information from the aligned data frames on the BPU bus 36. The compressed video information is decoded and placed on a pixel bus local to each VPU 26. The decoded video information on the pixel bus is made available for encoding in the VPU 26 for algorithm transcoding, spatial mixing, and transmission rate matching applications. The encoded video information is then placed on the BPU bus 36 for further processing by the BPUs 22 as in the standard conference arrangement. The mixed encoded audio may be delayed in memory to compensate for the time spent processing the video information in the VPU 26.

The MVIP-compliant Network Bus 34 comprises eight full-duplex, serial time-division multiplexed 125 μs data streams which adhere to the Mitel ST-BUS (Serial Telecom) Generic Device Specification. Each data stream operates at 2 Mbps and is divided into 32 separate timeslots. The total capacity of the bus is therefore 256 timeslots with each timeslot having a capacity of 64 Kbps. In addition to being time-division multiplexed within a data stream, the digital data is space-division multiplexed across the data streams. In this way, a frame of digital data from a communications network can be multiplexed across any of the 256 timeslots for intra-MCU communications.

The MVIP-derivative BPU bus 36 is a TDM serial bus capable of handling sixteen streams. In one embodiment, each stream operates at 2 Mbps, and has 32 timeslots,. each timeslot at 64 Kbps for a total of 32 Mbps transfer rate. In another embodiment operating at 4 Mbps, there are 64 timeslots in each stream, for a total of 64 Mbps.

The HPU 24 provides a management interface to a workstation (not shown) for MCU operations. Through the HPU 24, an operator can control and manage the operation of the other components. The HPU 24 controls the setup and establishment of conferences, and performs monitoring and maintenance functions.

Each NIU 20 connects the MCU 10 with a particular communications network to a particular codec 38 through an appropriate interface port. The NIU 20 formats the digital data frames that pass between the MCU 10 and codecs 38 for transmission within the MCU 10 and across the various communications networks. Because the MCU 10 supports many codec connections simultaneously, tariffs usually favor use of multiplexed high-speed interfaces. The most common type of NIU 20 supports a single T1 or ISDN primary rate interface over which the network service (e.g., a communications carrier) has time-division-multiplexed a number of individual codec connections. The MCU 10 can also include NIUs having interface ports that support only single codec connections. The frame structure for the data exchanged between the MCU 10 and the codecs 38 is defined in TSS Rec. H.221. Each NIU 20 reformats the digital data frames from the incoming line to an internal MCU format that is independent of the individual codec interfaces to the communications network. The reformatted data is then multiplexed onto the Network Bus channels for transmission to the BPUs 22.

The TSS H-series recommendations specify that the video data be switched between codecs but do not specify how an MCU performs the switching function. The MCU 10 shown in FIG. 2 implements video switching as time and space division multiplexing, instead of analog signal selection switching. The BPUs 22 handle video switching within conferences by selecting and routing time and space-division multiplexed digital data.

Each BPU 22 can support four codecs (audiovisual terminals) and multiple BPUs may be connected through the BPU bus 36. For each codec connection, the BPU 22 demultiplexes the digital data frames from the Network Bus 34, mixes the digital audio data, and multiplexes new digital data frames onto the Network Bus 34 from the mixed digital audio and the appropriate digital video and conferencing data.

Figure 3:
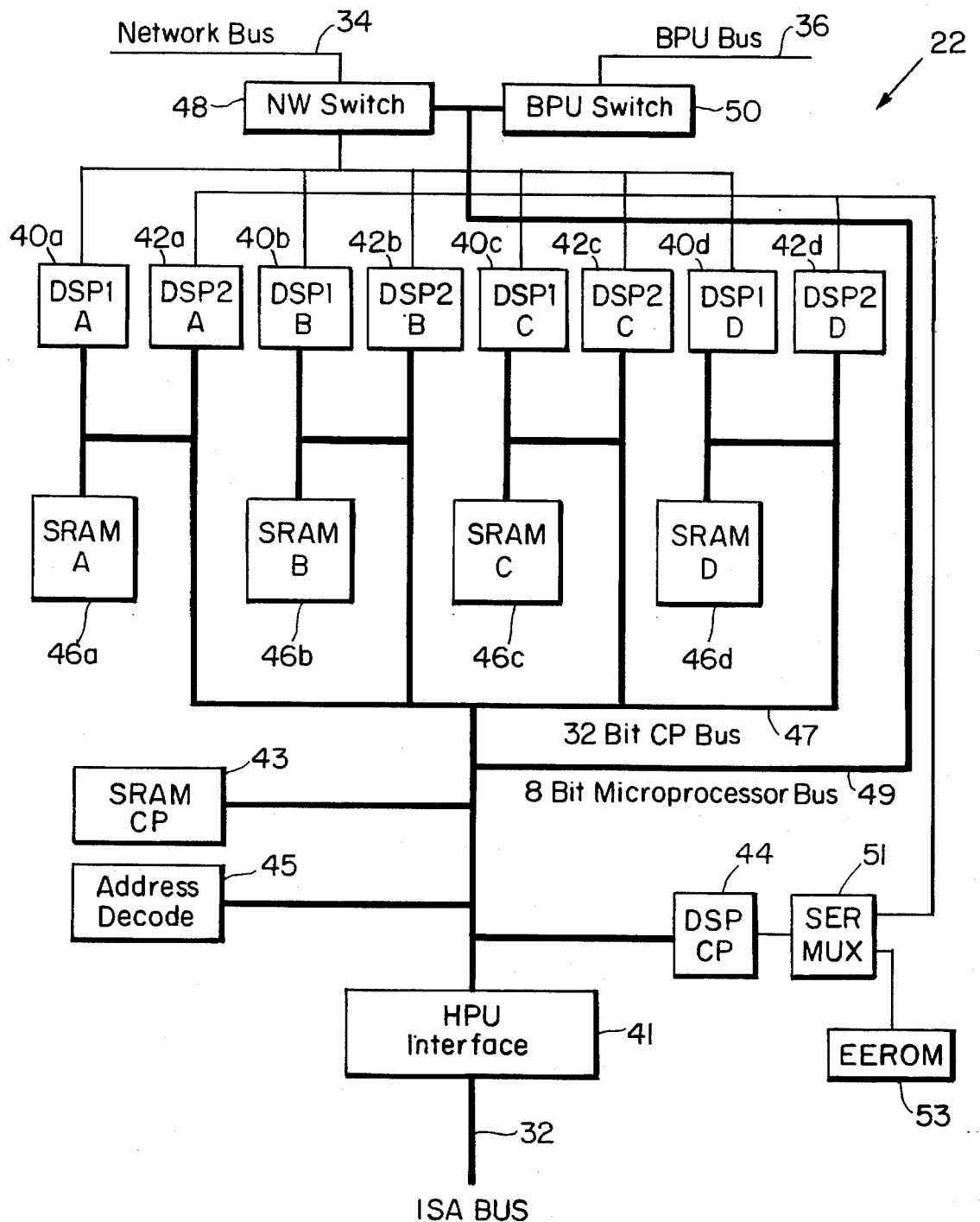
FIG. 3 is a block diagram of a Bridge Processing Unit of the MCU configuration of FIG. 2.

A detailed block diagram of BPU 22 is illustrated in FIG. 3. The BPU 22 is segmented into four partitions (A, B,C,D), each partition having a pair of Digital Signal Processors (DSP) 40, 42 assignable to a particular codec. Each BPU partition (A,B,C,D) contains a first DSP (DSP1) 40 and a second DSP (DSP2) 42. In general, DSP1 40 transfers and analyzes data to and from the Network Bus 34 and manages a buffer for this data in SRAM memory 46 shared between DSP1 40 and DSP2 42. In general, DSP2 42 processes data that has been pre-processed by DSP1 40 and maintains inter-BPU communications over the BPU Bus 36.

Each BPU 22 also has a DSP that functions as a Control Processor (CP) 44 which maintains a list of partition associations. Because the data streams on the Network Bus 34 and BPU Bus 36 are time and space division multiplexed, the CP 44 operates a Time Division Multiplexer (TDM) having a network switch 48 and a BPU switch 50 to direct selected digital data frames from the data channels to the correct BPU partition. The TDM may be implemented by a Mitel MT8980D Digital Switch. The CP 44 supports a 32 bit CP bus 47 to the DSPs 40, 42 in the four partitions (A,B,C,D). In addition, the CP 44 supports an 8 bit bus 49 to the network switch 48 and the BPU switch 50. The CP 44 interfaces to TDM data streams through serial multiplexer 51. BPU configuration information may be stored in EEROM 53.

The BPU 22 has an HPU interface 41 which allows the HPU 24 (FIG. 2) to perform memory access of a CP SRAM memory 43 and I/O access to control the CP 44. Address decode block 45 supports HPU I/O access to the BPU 22 using programmable dip switches selected by system configuration.

Broadly, the DPU 28 performs two functions: 1) protocol handling of T.120 stacks for multilayer protocol (MLP) conferencing applications and 2) protocol handling, video bridging and audio processing for PCS (Intel) codec applications. MLP is defined in the H-series Recommendations H.200/AV.270 and will not be discussed further.

Figure 4:
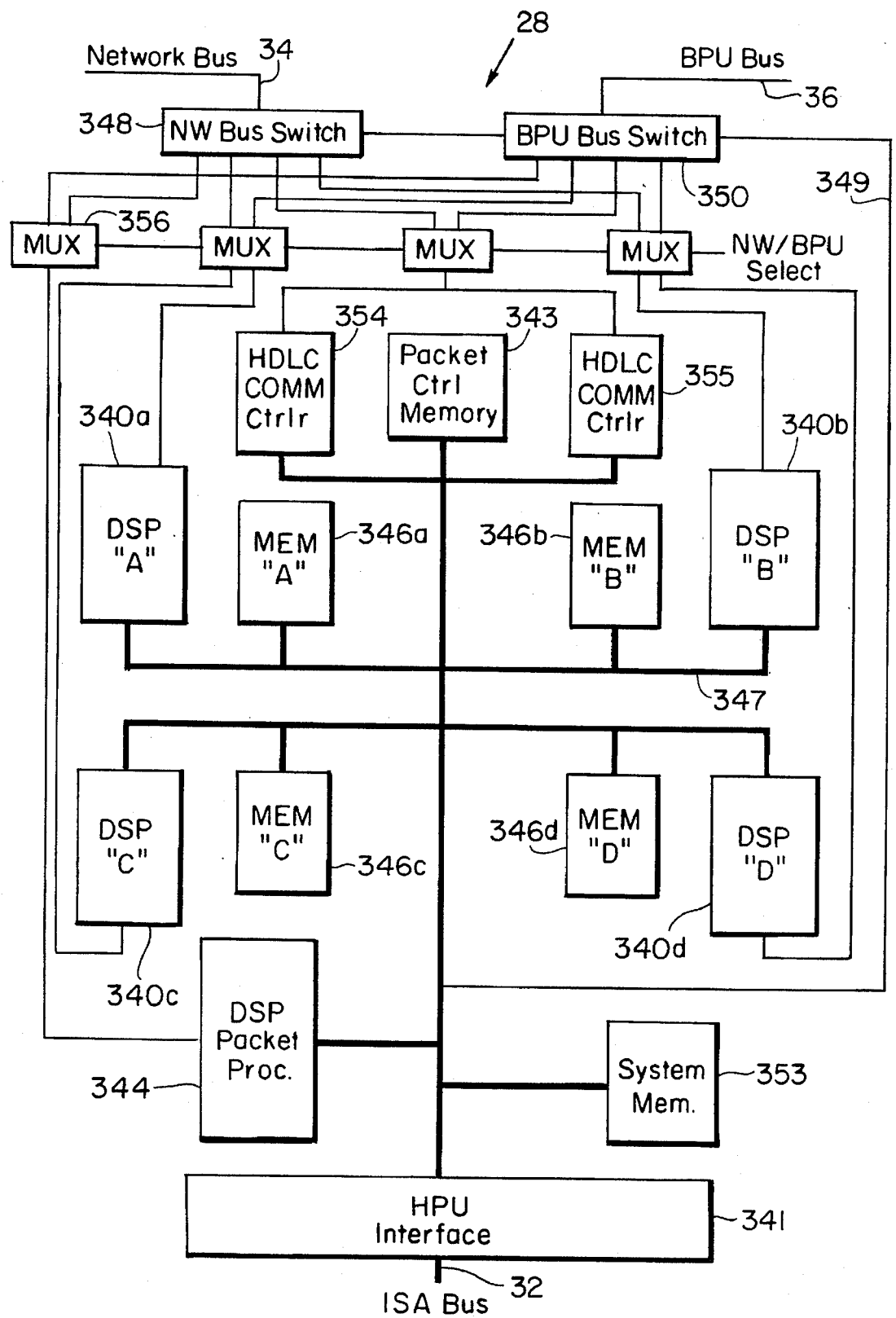
FIG. 4 is a block diagram of a Data Processing Unit of the MCU configuration of FIG. 2.

Each DPU 28 can support four codecs (audiovisual terminals) and multiple DPUs can be connected through the BPU bus 36, similar to that used for BPUs 22. A detailed block diagram of the DPU 28 is illustrated in FIG. 4. The DPU 28 is segmented into four partitions (A, B, C, D), each partition having a Digital Signal Processor (DSP) 340 assignable to a particular codec. These DSPs 340a–d perform the functions of audio decoding, audio mixing, and audio encoding. Each DSP 340 has a dedicated memory 346.

Each DPU 28 also includes a DSP for control and packet processing functions, a packet processor (PKP) 344. A system memory 353 is dedicated to the PKP 344. The PKP 344 controls a network bus switch 348 and a BPU bus switch 350 to direct selected packets from the network bus 34 and the BPU bus 36 respectively to the correct DPU partition (A, B, C, D). The network bus switch 348 may be implemented by two Mitel MT8980 Digital Switches, one switch each for transmit and receive. The BPU bus switch 350 may be implemented by Mitel MT8986AP digital switches. Additionally, multiplexers 356 connect the outputs of network bus switch 348 and BPU bus switch 350 to the DSPs 340, the PKP 344, and two HDLC controllers 354 and 355.

There are two 32 channel HDLC communication controllers 354 and 355 which have access to data on the network bus 34 through the network bus switch 348. The HDLC controllers 354 and 355 may be implemented by Siemens "Munich" PEB20320 devices. A packet control memory 343 serves the two HDLC controllers 354 and 355 with control and configuration information.

The PKP 344 supports a 32 bit bus 347 for controlling and loading the DSPs 340a–d and the HDLC controllers 354, 355. In addition, the PKP 344 supports an 8 bit bus 349 to control the network bus switch 348 and the BPU bus switch 350.

The DPU 28 has an HPU interface 341 which allows the HPU 24 (FIG. 2) to perform program download to the system memory 353 and I/O access to control the PKP 344 over ISA bus 32.

Data flow through the DPU 28 will now be described. Data packets which have been HDLC encoded by a transmitting audiovisual terminal are received via an NIU 20 and placed onto the network bus 34. An HDLC controller 354, 355 receives the data packets from the network bus 34 and removes HDLC framing and stuff bits. The HDLC controller 354, 355 then places the packet into the appropriate DSP memory 346a–d via a DMA process. The HDLC controllers 354, 355 are programmed by the PKP 344 using configuration information loaded into the packet control memory 343. The PKP 344 programs the association of the serial input timeslots received by the HDLC controller 354, 355 to the corresponding DSP memory 346a–d memory location. When an interrupt from the HDLC controllers 354, 355 indicating reception of a data packet is received, the PKP 344 communicates to the appropriate DSP 340a–d that a new data packet is now in the respective DSP memory 346a–d.

The DSPs 340 determine whether the packets in memory are audio or video packets. Video data is placed directly onto the BPU bus 36. Audio data is first decoded to PCM data before being placed onto the BPU bus 36.

Video data from another video source (audiovisual terminal) is received from the BPU bus 36 by a DSP 340 associated with the audiovisual terminal expecting to receive such video data. The header for this video data is modified with the appropriate address and time stamp information. Audio PCM data streams available on the BPU bus 36 are mixed from one to four sites into a single audio stream and encoded. The encoded audio data is placed into the appropriate DSP memory 346a–d with appropriate header information.

When audio or video data packets are ready for transmission onto the network bus 34, the DSP 340 interrupts the PKP 344 to indicate that a packet is available for transmission. The PKP 344 configures the HDLC controller 354, 355 appropriately to take the packet from DSP memory 346 via a DMA process and add HDLC framing and stuff bits. The HDLC encoded data packet is then placed into the appropriate timeslot on the network bus 34.

Figure 5:
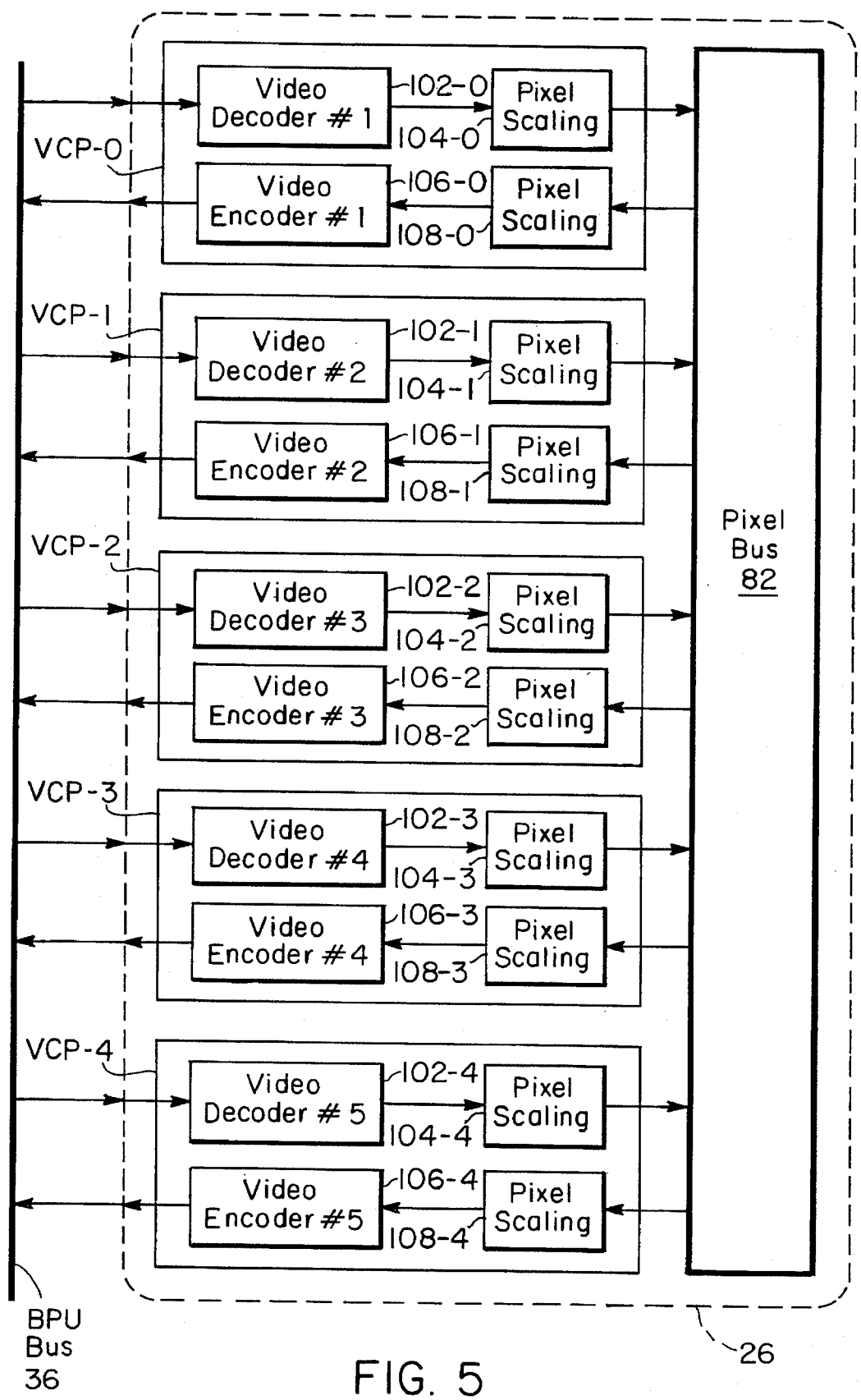
FIG. 5 is a schematic block diagram of an embodiment of a VPU.

Having described the components (BPU, DPU, NIU, HPU) of the MCU 10 which enable the basic conference bridging functions, it may be useful to understand first at a high level the flexibility provided by the VPU embodiment of the present invention. FIG. 5 is a functional block diagram of VPU 26. In a preferred embodiment, compressed video information from up to five audiovisual terminals which are in the same conference may be routed to a particular VPU 26 over the BPU bus 36. The VPU 26 comprises five video compression processors (VCP0–VCP4), each having a video decoder/encoder pair 102-i, 106-i, and pixel scaling blocks 104-i, 108-i.

A video decoder and encoder pair 102-i, 106-i is assignable to the compressed video information stream associated with each particular audiovisual terminal in the conference. Each video decoder 102-i decodes the compressed video information using the algorithm that matches the encoding algorithm of its associated audiovisual terminal. Included as part of the video decoder 102-i may be the processing to determine the framing, packets, and checksums which may be part of the transmission protocol. It should be noted that a processor encoded video stream could be assigned to multiple audiovisual terminals (e.g., a continuous presence application having more than five audiovisual terminals in the conference). In addition, a decoder/encoder pair 102-i, 106-i can switch between assignable audiovisual terminals within a conference.

The decoded video information, or pixels, are then scaled up or down (if necessary) by a pixel scaling block 104-i to match the pixel resolution requirements of other audiovisual terminals in the conference that will be encoding the scaled pixels. For example, a desktop system may encode at a resolution of 256×240 while an H.320 terminal would require a pixel resolution of 352×288 for a Common Intermediate Format (CIF) image.

The scaled pixels are then made available to any other video encoder 106-j on a shared pixel bus 82. Each encoder 106-j is allowed a fixed amount of time (a timeslot) to output pixels onto the pixel bus 82, effectively creating a time division multiplexed bus. Each encoder 106-j may sample any of the images available on the pixel bus timeslots for re-encoding and/or spatial mixing. Another pixel scaling block 108-j is coupled between the pixel bus 82 and the encoder 106-j for adjusting the pixel resolution of the sampled image as needed.

The combination of decoding, encoding, scaling, and pixel bus sharing in the digital domain provides a particularly flexible and efficient means for algorithm transcoding and transmission rate matching.

The following examples illustrate the data flow within the MCU for continuous presence (spatial mixing), algorithm transcoding, and transmission rate matching applications of the present invention.

Figure 6:
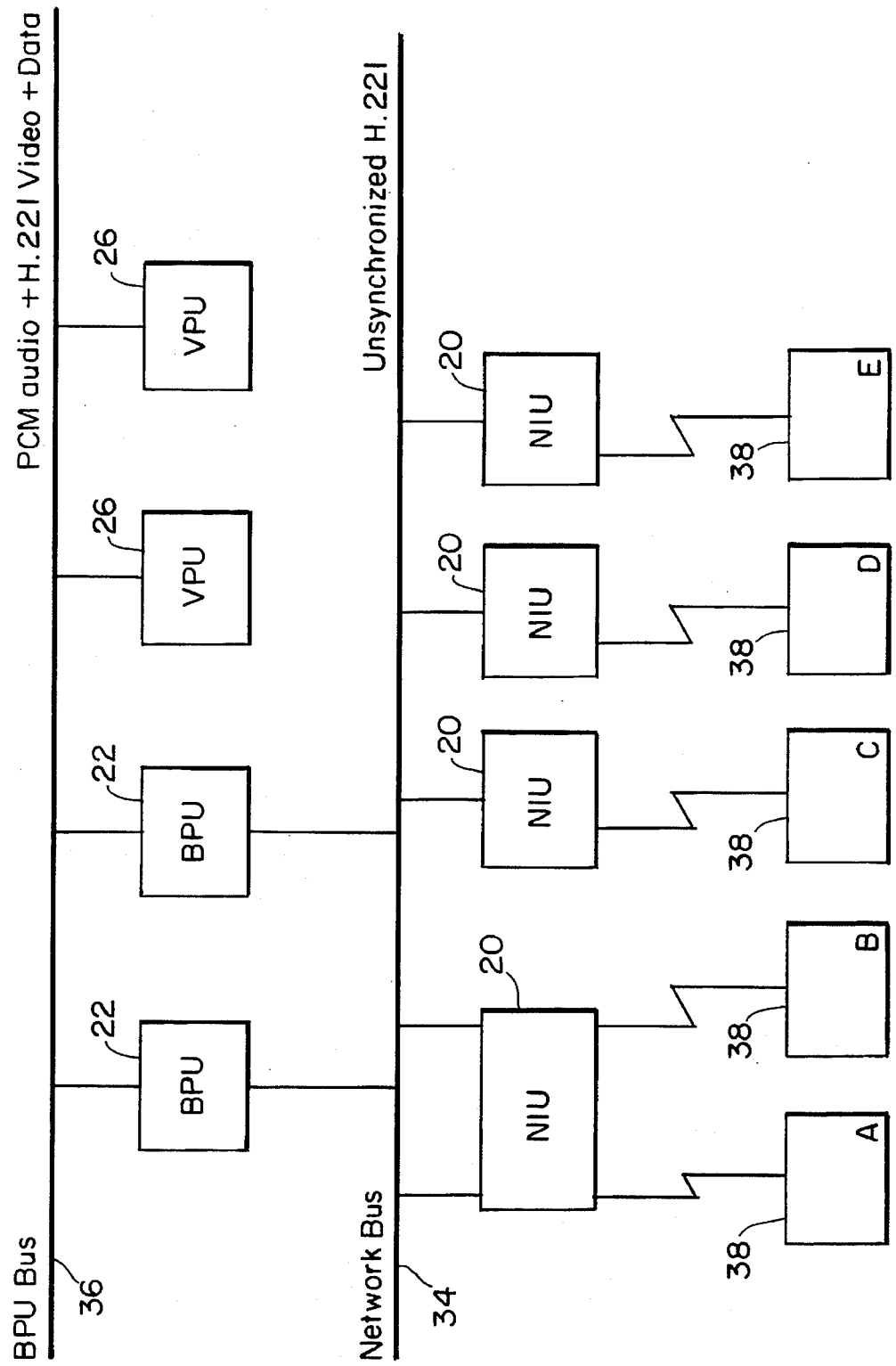
FIG. 6 is a block diagram of an MCU configuration illustrating the data flow for continuous presence and rate matching applications.
Figure 7:
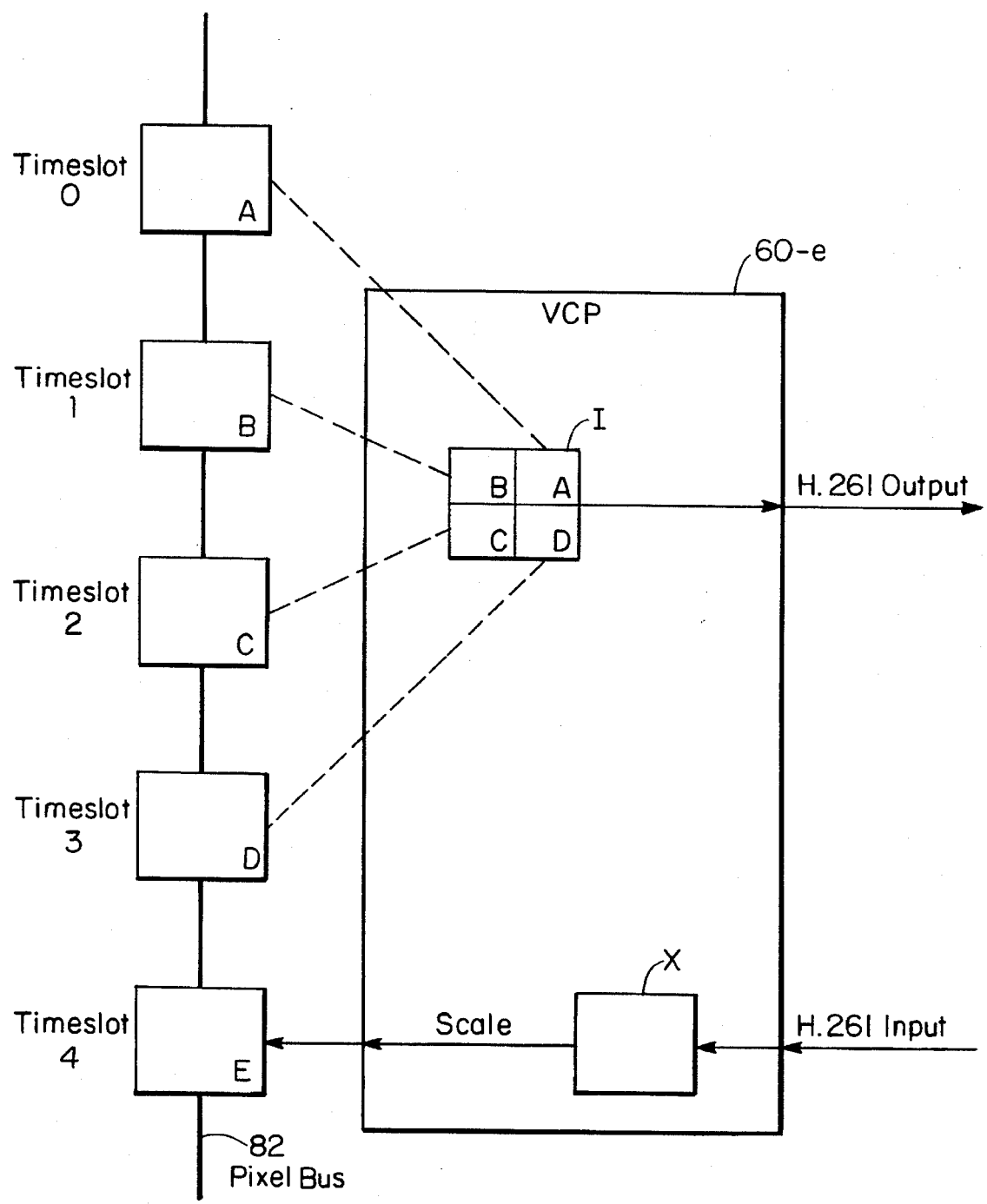
FIG. 7 is a block diagram illustrating image tiling in a continuous presence application.

A continuous presence application will now be described with reference to FIGS. 6 and 7. Note that the ISA bus 32 (FIG. 2) is not shown. In FIG. 6, data from audiovisual terminals 38 arrive over a communications network to respective NIUs 20. Five audiovisual terminals 38 (A, B, C, D, E) are connected in the conference and may be, for example, H.320 terminals. Audiovisual terminals A and B are shown connected to a particular NIU 20 which supports multiple codec connections (e.g., a T1 interface). The other audiovisual terminals C, D, and E connect to NIUs 20 supporting only a single codec connection (e.g. an ISDN interface). Each audiovisual terminal 38 places one or more octets of digital data onto the network bus 34 as unsynchronized H.221 framed data. The data is unsynchronized since the bit alignment does not necessarily begin on an octet boundary. In addition, which octet within the 80 octet H.221 frame is not yet known. The BPUs 22 then determine the H.221 framing, align the octets, and determine the H.221 octet number. This aligned data is made available to all other units on the BPU bus 36.

The BPUs 22 also extract audio information from the H.221 frames and decode the audio into 16 bit PCM data. The decoded audio data is made available on the BPU bus 36 for mixing with audio data from other audiovisual terminals.

Aligned H.221 frames are received by the VPU 26 for processing by encoder/decoder elements called Video Compression Processors (VCPs). The VPU 26 has five VCPs (FIG. 5) which in this example are respectively assigned to the audiovisual terminals 38 (A, B, C, D, E). A VCP 60-*e* on the VPU 26 which is assigned to audiovisual terminal 38 (E) is functionally illustrated in FIG. 7. Compressed video information (H.261) is extracted from the H.221 frames and decoded by the VCP 60-*e* as image X. The decoder video image X is placed on the pixel bus 82. FIG. 7 shows the pixel bus 82 with decoded video frames from each audiovisual terminal 38 (A–E) located in successive timeslots (0–4). The VCP 60-*e* assigned to terminal E receives the decoded video frames from terminals A, B, C and D which are then tiled (spatially mixed) into a single composite image I. The tiled image I is then encoded as H.261 video within H.221 framing and placed on the BPU bus 36 (FIG. 6) for BPU processing as described above.

In a transmission rate matching application, the data flow through the NIUs 20 and BPUs 22 to the VPU 26 is similar to that of the continuous presence application. Referring again to FIG. 6, the audiovisual terminals 38 are, for purposes of this example, H.320 terminals operating at different network data rates. For example, terminals A, B and C can be operating at 2B(ISDN) network rates while terminals D and E can be operating at T1 network rates.

Figure 8:
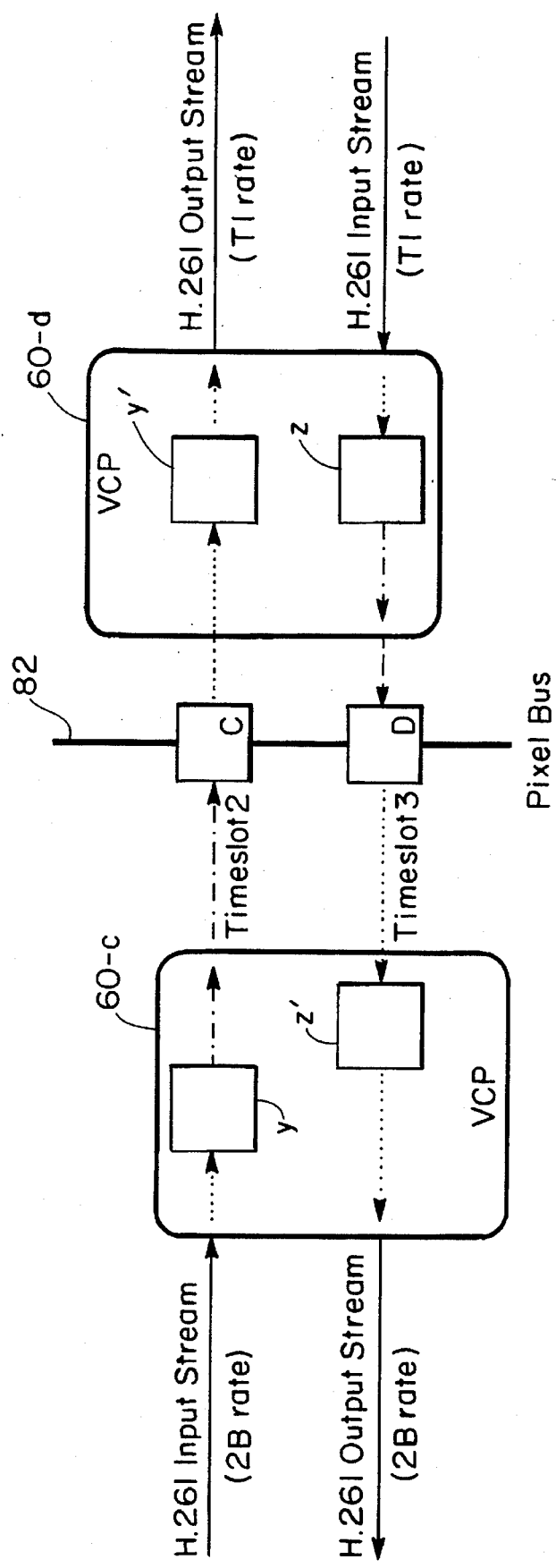
FIG. 8 is a block diagram illustrating rate matching using the pixel bus arrangement.

As with the continuous presence application, the VPU 26 receives H.221 frames from the BPU bus 36. Referring to FIG. 8, a VCP 60-*c* extracts and decodes compressed video information (H.261) from the H.221 frames associated with audiovisual terminal 38 (C) at the 2B rate. The decoded video image Y is placed on the pixel bus 82. Similarly, VCP 60-*d* extracts and decodes H.261 video information from H.221 frames associated with audiovisual terminal 38 (D) at the T1 rate. The decoded image Z is also placed on the pixel bus 82 in the timeslot assigned to VCP 60-*d*. Since the pixel bus 82 has decoded digital video frames available to all five of the VCP processors, the video frames can be simultaneously re-encoded by different VCPs at different rates to allow multiple rate operation in a single conference. In this particular example, decoded image Y from terminal C is input from the pixel bus 82 by VCP 60-*d* and re-encoded as image Y' for transmission at the T1 rate. Similarly, decoded image Z from terminal D is input from pixel bus 82 by VCP 60-*c* and re-encoded as image Z' at a different rate (2B).

The rate matching of the present invention, whereby the pixel bus makes decoded video frames available to all VCPs for re-encoding at different rates, avoids having to operate different rate terminals at the rate of the lowest rate terminal. This is possible because the video frames on the pixel bus are uncompressed. The uncompressed video frames placed on the pixel bus by a VCP associated with a low rate terminal (e.g., 2B rate) are taken off (sampled) from the bus by a VCP associated with a high rate (e.g. T1) terminal. Some video frames from the low rate terminal will be repeated on the bus relative to the high rate sampling associated with the high rate terminal. Similarly, uncompressed video frames from the high rate terminal are sampled from the bus by the VCP associated with the low rate terminal. Some video frames from the high rate terminal will be missed relative to the low rate sampling associated with the low rate terminal. However, since the video frames are uncompressed, each terminal still receives an intelligible video signal with an image resolution matching the lower resolution of the source/receiving terminal pair.

Figure 9:
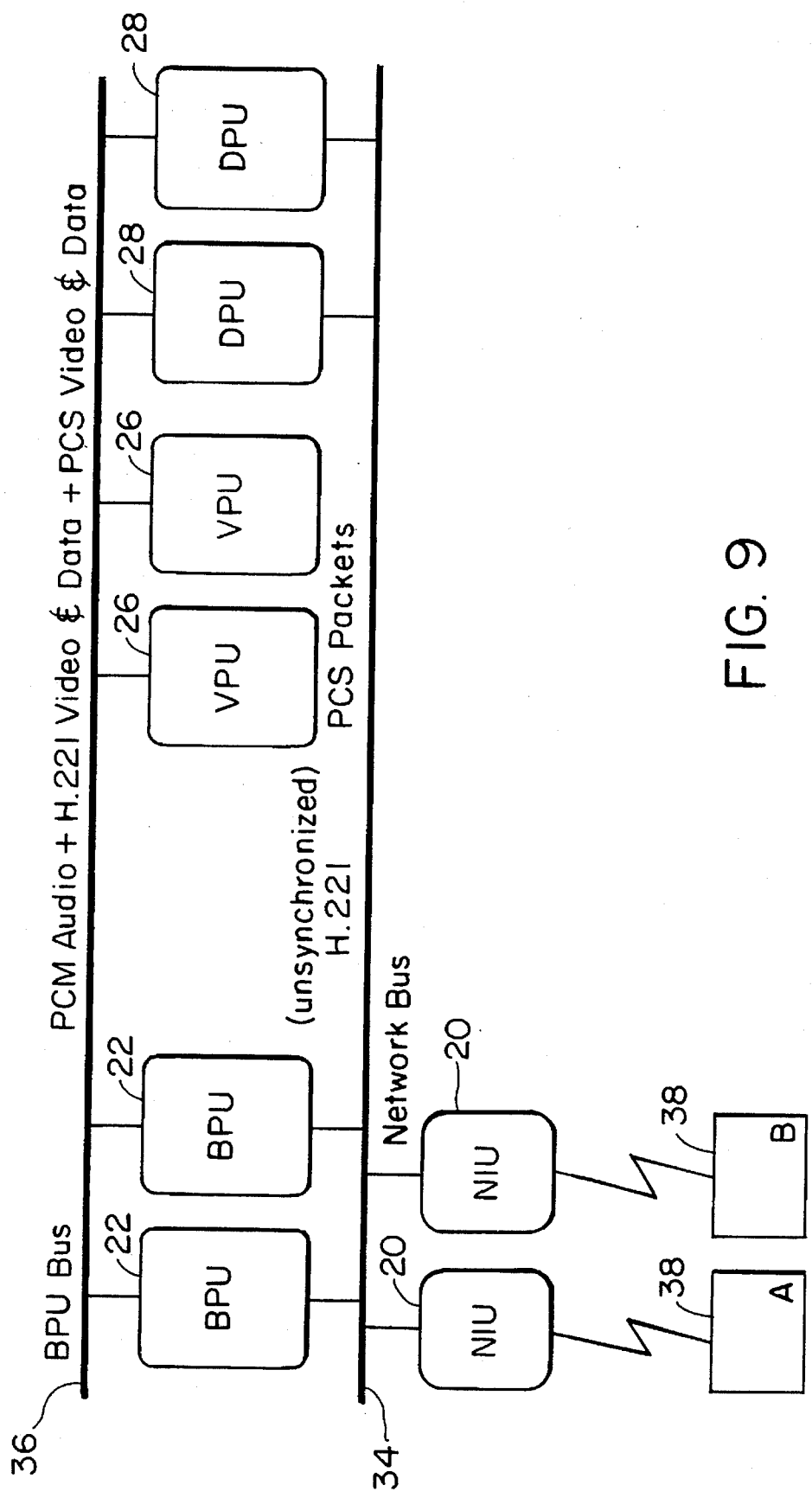
FIG. 9 is a block diagram of an MCU configuration illustrating the data flow for an algorithm matching application.

An example of algorithm transcoding will now be described with reference to FIGS. 9 and 10. In this example, terminals using different video compression algorithms are connected in the same conference. Specifically, referring to FIG. 9, audiovisual terminal 38(A) can be a PCS (Intel) terminal while terminal 38(B) can be an H.320 terminal. The H.221 frames from terminal 38(B) flow through the NIU 20 and BPUs 22 to VPU 26, similar to the previously described applications.

Figure 10:
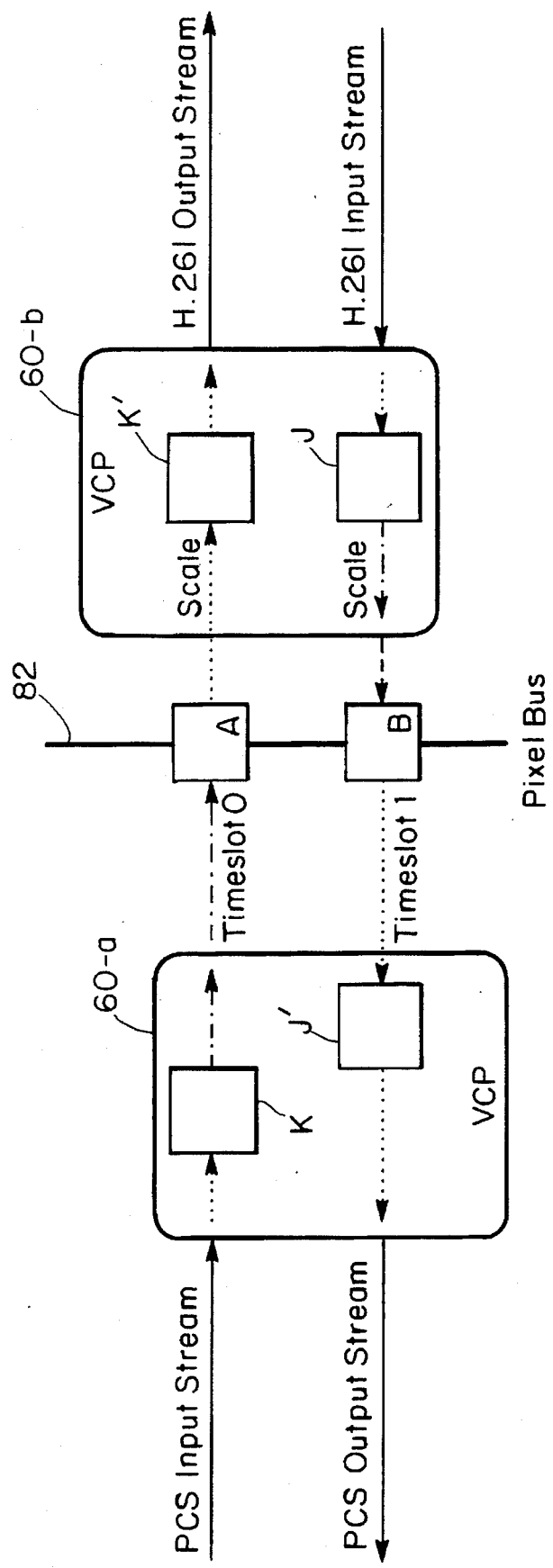
FIG. 10 is a block diagram illustrating algorithm matching using the pixel bus arrangement.

A VCP 60-*b* extracts and decodes compressed video information (H.261) from H.221 frames associated with audiovisual terminal 38(B) as shown in FIG. 10. The decoded image J may possibly be scaled and then is placed on the pixel bus 82 in the assigned timeslot. In this example, each decoded H.320 image would be scaled from 352×288 (CIF) or 176×144 (QCIF) to match the respective PCS standard image sizes of 320×240 and 160×120. In general, the scaling as both input and output to the pixel bus offers flexibility and would be different for transcoding image J for another conference terminal using a different compression algorithm in the same conference. The decoded image J is available to be input by VCP 60-*a* for re-encoding using the PCS video compression algorithm. The encoded image J' has header information added to it to create PCS video packets. Referring again to FIG. 9, these packets are transmitted onto the BPU bus 36 and received by a DPU 28.

The PCS packets are HDLC encoded by the DPU 28 and transmitted to the Network Bus 34. PCM audio information from both terminals (H.320 and PCS) are mixed in the DPU 28, placed into PCS audio packets, HDLC encoded, and placed on the Network Bus 34. From the Network Bus 34, the NIU 20 sends the PCS packets to terminal 38(A).

Referring again to FIG. 9, the data flow from audiovisual terminal 38(A) to VPU 26 is different in that PCS packets are routed through DPU 28 instead of the BPU 22. In other algorithm transcoding examples, the data flow may be such that video frames are switched through only BPUs 22 rather than through DPUs 28, depending on the particular compression algorithm. In this example, the DPU 28 receives the PCS packets from the Network Bus 34 and removes the HDLC encoding. The DPU 28 then decodes audio packets to PCM data. Finally, the DPU 28 places the PCM data and video packets onto the BPU bus 36.

A VCP 60-a extracts and decodes PCS compressed video packets associated with terminal 38(A) as shown in FIG. 10. The decoded image K is placed on the pixel bus 82 in the assigned timeslot 0. The VCP 60-b inputs the image K from pixel bus 82 for re-encoding using the H.261 video compression algorithm. The encoded image K' is then framed with the H.221 structure and placed onto BPU bus 36 for routing through BPU 22 and NIU 20 to terminal 38(B).

It should be noted that the algorithms or terminal types can be other than those shown in the previous example, and that more than two algorithms can be transcoded in a multi-party conference. In addition, combinations of the three examples described above are possible. For example, a continuous presence conference with spatial mixing could be formed between terminals using unlike video compression algorithms at different transmission rates. Each tile of the spatially mixed video would have the best available image resolution.

Figure 11A:
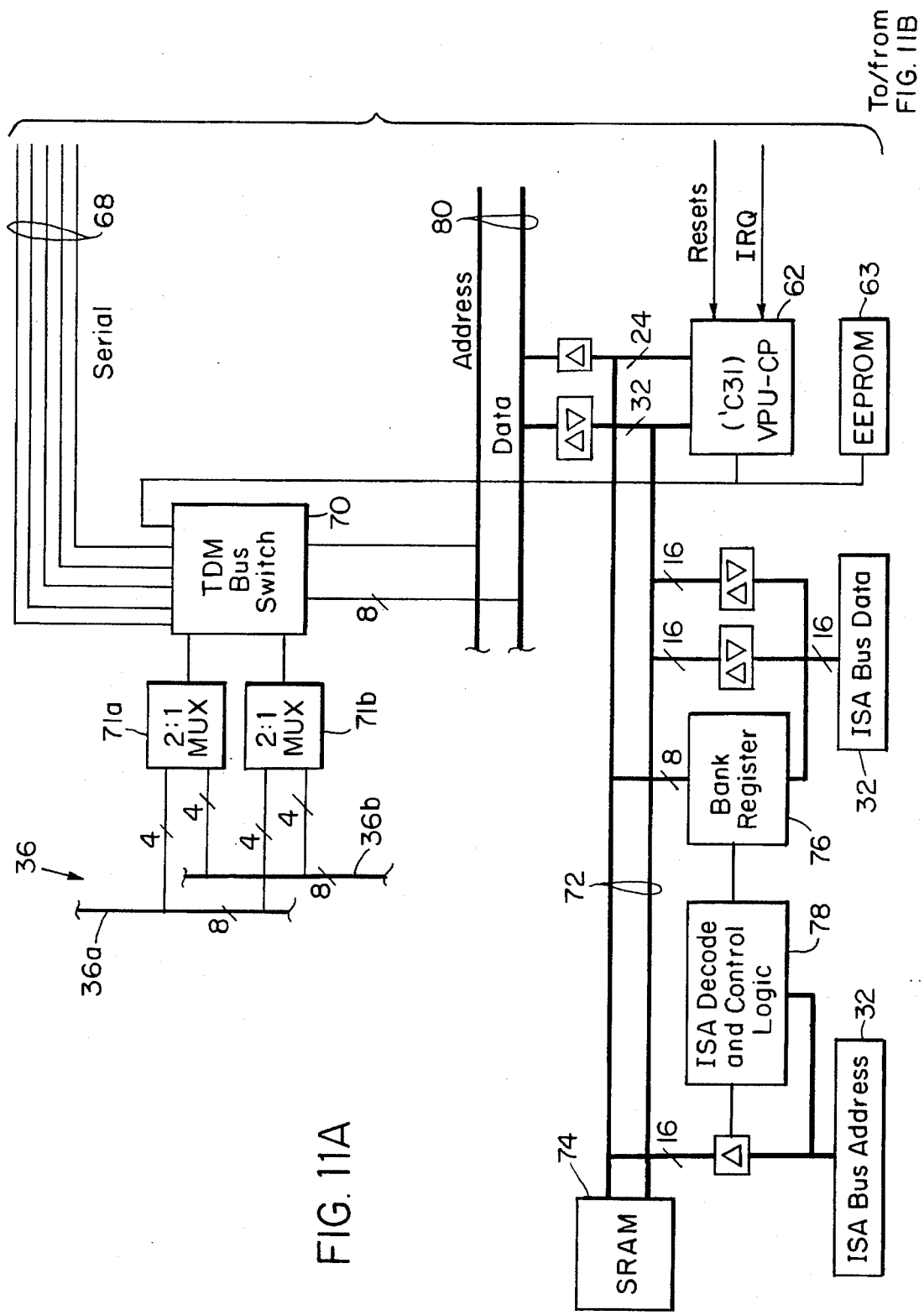
FIG. 11 is a schematic block diagram of a preferred embodiment of the VPU.
Figure 11B:
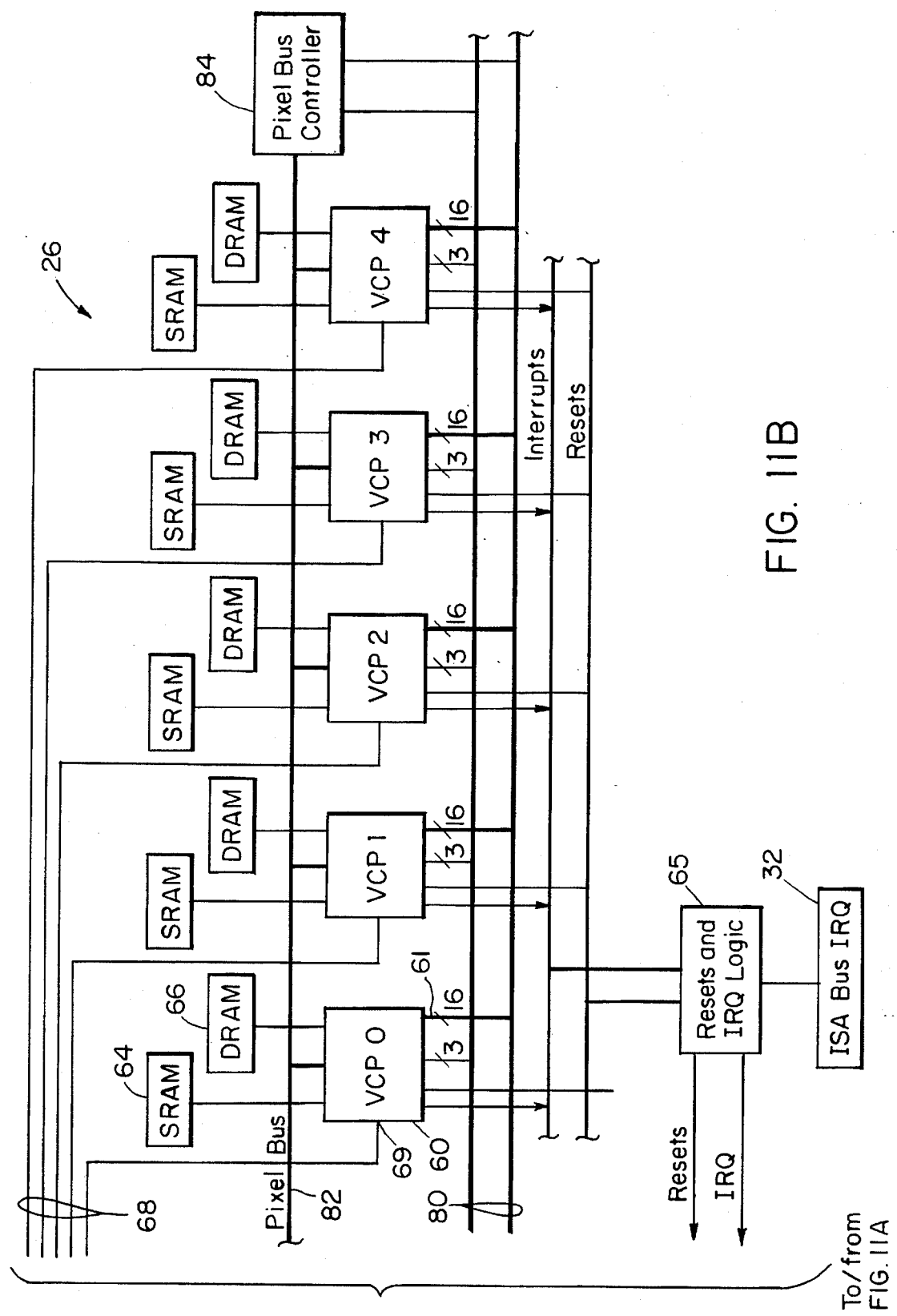

A specific implementation of the VPU 26 will now be described in detail with reference to FIG. 11. The VPU 26 includes multiple video compression processor (VCPs) 60 to provide algorithm transcoding and transmission rate matching. A proprietary 16 bit parallel pixel bus 82 allows for sharing of decoded video frames between VCPs 60. The pixel bus 82 allows for spatial mixing in continuous presence applications, or re-encoding of images for video transcoding applications. Operation of the pixel bus 82 will be described below.

Overall control of, and communication with the video processors is handled by a control DSP (VPU-CP) 62, an embedded DSP processor. The VPU-CP 62 may be implemented by the Texas Instruments TMS320C31 DSP. The VPU-CP 62 has responsibility for control of a TDM bus switch 70, VCP program download, and communication between the HPU 24 and VCPs 60. In addition, the VPU-CP 62 stores configuration information in serial EEROM 63.

A CP-Bus 72 is the control processor DSP's (VPU-CP) 62 external memory bus. Most of the control registers, memory and interfaces are memory mapped onto this bus, including VPU-CP SRAM memory 74, TDM bus Switch control and VCP host port registers. The VPU-CP 62 is the default owner of the bus. The HPU 24 also has access to the entire address range of the control bus through a combination of the ISA shared memory window and a CP-Bus bank register 76. ISA Decode and Control Logic 78 on the VPU host interface arbitrates the VPU-CP 62 off the CP-Bus 72 for each HPU access.

The CP-Bus 72 is split to isolate the higher speed SRAM access activity of the VPU-CP 62 and the slower speed registers and peripherals. The VCPs 60 and control registers are thus located on what is called a PKBus 80.

Communication to each VCP 60 is through a host port interface on the CP-Bus 72. Each VCP 60 has its own private SRAM program memory 64 and DRAM frame memory 66. A CHI serial interface 68 from each VCP connects to the BPU bus 36 via TDM bus switch 70. There may be one to five VCPs populated on a VPU board, depending on the required processing for a given application.

A communication interface to the VPU 26 is provided by the MVIP derivative TDM serial bus, the BPU bus 36. The BPU bus 36 allows the VPU 26 to interface to the BPUs 22, which provide H.221 format Audio/Video/Data to the VPU 26, and to DPUs 28 which provide data conferencing and audio decoding functions.

The ISA bus 32 is intended primarily for control; data is not typically transferred to the VPU 26 over the ISA bus. VPU-CP boot programs are downloaded from the HPU 24 (FIG. 2) via the ISA bus 32. Through the ISA bus 32, the entire 16 Megaword memory space of the CP-Bus 72 can be accessed. The HPU interface is an ISA adapter interface. The VPU 26 uses both I/O mapped and memory mapped addressing. Interrupt requests from the VPU-CP 62 or the VCPs 60 to the HPU 24 are controlled through IRQ logic 65.

The VPU 26 includes five identical video compression subsystems, or VCPs 60, which perform video compression, decompression, and pixel mixing. The VCPs 60 are programmable which enables the VPU 26 to perform various compression algorithms.

The VCPs 60 are based on the Integrated Information Technologies VCP device. These devices are highly integrated single-chip programmable video codec processors. Each VCP 60 along with external DRAM frame memory 66 and SRAM program memory 64 forms a complete codec. Multiple compression algorithm support is provided through the capability to have algorithm-specific programs downloaded (e.g., H.261, MJPEG and MPEG). Proprietary compression algorithms may also be ported to the VCP devices.

Figure 12:
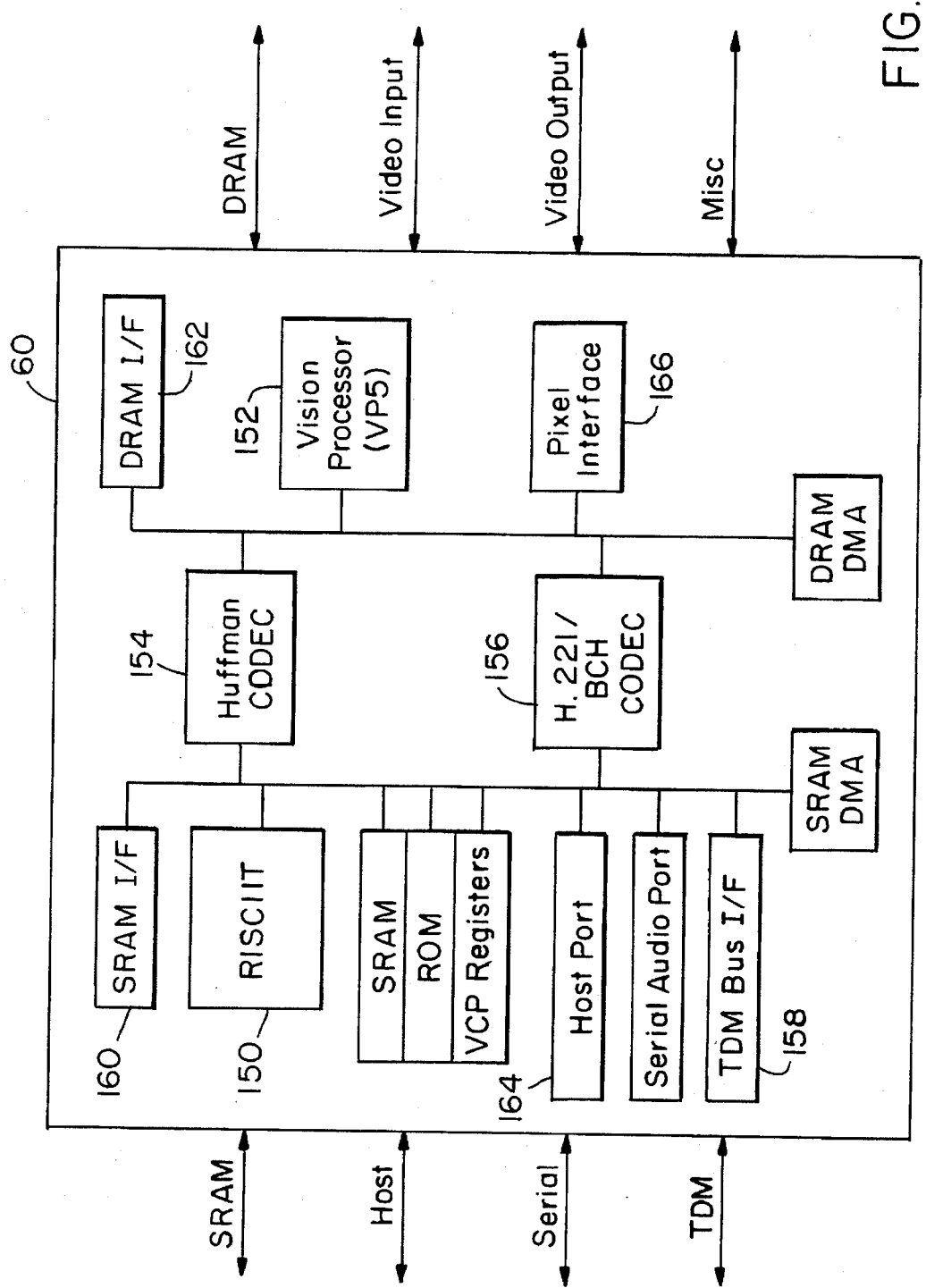
FIG. 12 is a functional block diagram of a Video Compression Processor (VCP).

Each VCP 60 is a self-contained codec as shown in FIG. 12. It should be noted that even though the VCPs in the specific embodiment described are configured as full codecs, other embodiments may have VCPs configured as separate encoders and decoders. Internally, the major functional blocks include a RISC control processor (RISCIIT) 150, a vision processor (VP5) 152, a Huffman codec 154, a H.221/BCH codec 156, and external interfaces. The external interfaces include a TDM bus interface 158, an SRAM interface 160, a DRAM interface 162, a host port 164, and a pixel interface 166.

The programmable RISCIIT 150 maintains the host port 164, TDM interface 158 and pixel interface 166, and controls the H.221/BCH 156, Huffman CODEC 154 and other peripherals internal to the VCP. The VP5 152 performs the compression primitives and is controlled by the RISCIIT 150. For detailed information, see the IIT VCP Preliminary Data Sheet and VCP External Reference Specification.

Program download and control is provided through a host port interface on each VCP 60. This host port interface is memory mapped onto the CP-Bus 72, allowing either the VPU-CP 62 or HPU 24 to access the VCPs 60.

Each VCP 60 is configured with private DRAM memory 66 for video data buffering. The SRAM memory 64 is used for RISCIIT program memory and buffering for the serial ports, H.221/261 codec 156, and Huffman CODEC 154.

Referring again to FIG. 11, the control and program download to the VCPs 60 is through a host port 61 on each VCP processor. This port has six registers. The term host in this section refers to the VPU-CP 62 (not the HPU) which serves as the host to the VCP processors. A list of the host port registers is shown in the following table:

| Address | Type | Name | Comments |
| --- | --- | --- | --- |
| VCP base+0 | R/W | hostdmaport | DMA compressed data in/out |

-continued

| Address | Type | Name | Comments |
|---|---|---|---|
| VCP base+1 | R/W | hostvcxport | Standard VCXI command interface |
| VCP base+2 | R/W | hostdbgport | Debug port |
| VCP base+3 | R/W | hostctl | Interrupt and DMA control |
| VCP base+4 | R/W | hostmask | Interrupt mask |
| VCP base+5 | R | hostirqstat | Interrupt status |

Each VCP 60 has a TDM port 69 which is connected to the BPU bus 36 through TDM bus switch 70. The TDM bus switch 70 may be implemented with Mitel 8986 digital switches. The TDM port 69 has a minimum offset between the frame sync pulse and the first bit of (the VCP's) timeslot zero. On the VPU 26, TDM data is aligned with the frame sync pulse, per the MVIP specification. The VCP TDM port 69 thus will need an offset line up with the first data bit in a timeslot. This has the effect that the timeslot numbering seen by the VCP is one less (modulo 64) than the timeslot numbering seen by the Mitel switches. For example, the VCP timeslot zero will correspond to the Mitel timeslot one.

Figure 13:
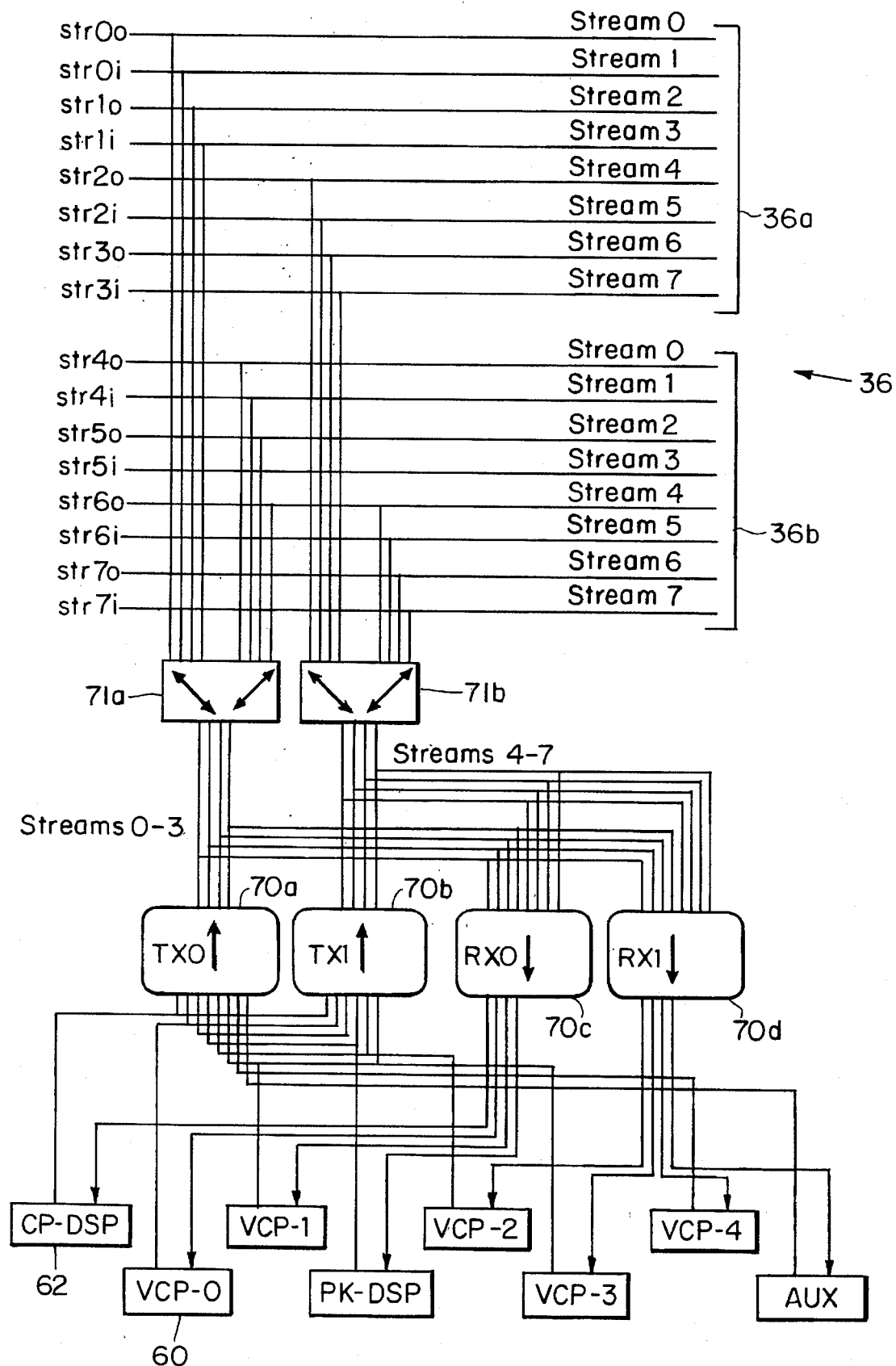
FIG. 13 is a schematic block diagram of a time division multiplex (TDM) bus switch arrangement of the VPU of FIG. 12.

The VCPs 60 and the VPU-CP 62 can connect via serial lines 68 to the BPU bus 36 having bus portions 36a and 36b through the TDM bus switch 70 which allows connection of up to any 32 of the total 512 timeslots on the BPU bus in the case of 2 Mbps operation or 64 of the total 1024 timeslots in the case of 4 Mbps operation. A block diagram of the BPU bus 36 and TDM bus switch 70 are shown in FIG. 13. The TDM bus switch 70 provides eight stream connections to the BPU bus 36. Since there are only eight streams (signal lines) which may be connected, MUXs 71a and 71b connect these eight streams from the TDM bus switch 70 in groups of four to eight of sixteen possible streams on the BPU bus 36 which are shown as bus portions 36a and 36b.

At a 4 Mhz bit rate, the MT8986 switches are configured as an eight in by four out crosspoint. To implement an eight by eight full duplex crosspoint requires four MT8986 switches: two switches 70a, 70b for transmit data, and two switches 70c, 70d for received data.

Referring again to FIG. 11, the pixel bus 82 is used to enable multiple VCPs 60 to share decoded pixel data. Each VCP 60 in succession has its output control signals driven, causing the particular VCP to output data onto the pixel bus 82. In addition, the pixel bus controller 84 drives the control signals to the pixel input of each VCP 60 causing the VCP 60 to input data only when programmed. The input data is then available for processing through the processor programming of the video interface DMA controllers internal to the VCP 60.

The pixel bus 82 connects the pixel outputs of the multiple VCPs 60 to the pixel inputs of the VCPs 60 through a time division multiplexing scheme. Each VCP 60 is enabled onto the pixel bus for equal amounts of time. The time that each VCP 60 can output is programmed in horizontal and vertical count registers, hcnt and vcnt, which define a fixed rectangle for outputting pixels onto the pixel bus 82. The fixed rectangular area is defined by the pixel bus controller 84 and need only be large enough to match the dimensions of the largest image served on the pixel bus 82. For example, the fixed rectangular area may be required to be 600×300 where the number of pixels per line (npix) is 600 and the number of lines (nlines) is 300.

Figure 14:
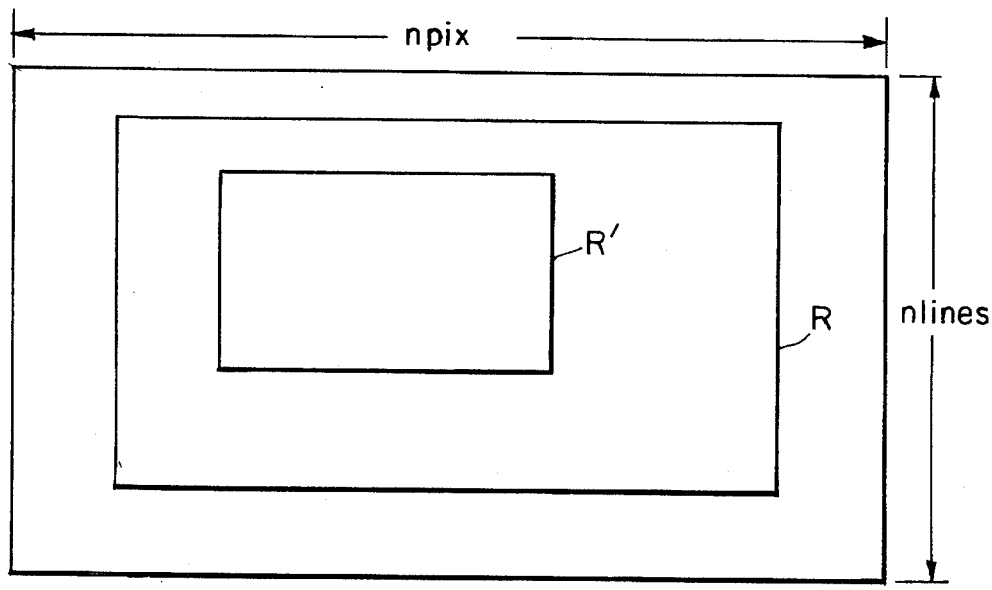
FIG. 14 is an illustration of a selectable region of interest within a pixel area.

Each VCP 60 is capable of outputting or receiving pixels from a region of interest within the npix by nlines rectangle as shown in FIG. 14. Since the VCP 60 has control over the size and location of its pixel output within the frame defined by the npix and nlines values, the VCP 60 does not need to "fill" the entire 600×300 image in the previous example. The VCP could output within the 600×300 output scan, for example, a CIF (252×288) rectangle R or a QCIF (176×144) rectangle R'. Other regions of interest can be defined also, e.g., PCS image sizes (320×240 and 160×120).

The timing parameters programmed into each VCP 60 must match those programmed into the pixel bus controller 84 hcnt and vcnt registers. The VCP pixel interface needs at least 13 pixels of horizontal blanking area and 4 lines of vertical blanking area. Thus, the active pixels output will always be offset from the upper right corner.

Each VCP 60 will be enabled for nlines lines, each of npix pixels. In the particular embodiment described herein, the count programmed into the control registers hcnt and vcnt is constrained to a multiple of four pixels and four lines. The formula for the line length and picture height is:

$$npix = 1028 - (hcnt*4)$$

$$nlines = 516 - (vcnt*4)$$

Or, in terms of the number of pixels and lines defining the fixed rectangle:

$$hcnt = \sim \left( \frac{npix}{4} - 2 \right)$$

$$vcnt = \sim \left( \frac{nlines}{4} - 2 \right)$$

where '~' is the bitwise inversion.
Each VCP 60 in turn will output to the pixel bus 82 and then the cycle will be repeated. Thus, the output frame rate will be $$framerate = \frac{2Xpixelclk(MHz)/2}{npix*nlines*5}$$

The following table has optimal parameter settings for various frame rates at clock (2xpixelclk) rates of 33.330, 28.322 and 27.000 MHz. It may be necessary to reduce the pixel clock rate to meet the constraints of filter tap length versus processor clock and pixel clock rate.

| Frame Rate[1] (Hz) | 2Xpixelclk clock (MHz) | npix | nlines | hcnt | vcnt |
|---|---|---|---|---|---|
| 30 | 33.330 | 372 | 300 | 0xA4 | 0x36 |
| 15 | 33.330 | 556 | 400 | 0x76 | 0x1D |
| 10 | 33.330 | 860 | 388 | 0x2A | 0x20 |
| 7.5 | 33.330 | 904 | 492 | 0x1F | 0x06 |
| 30 | 28.322 | 368 | 292[2] | 0xA5 | 0x38 |
| 15 | 28.322 | 372 | 508 | 0xA4 | 0x02 |
| 10 | 28.322 | 716 | 396 | 0x4E | 0x1E |
| 7.5 | 28.322 | 756 | 500 | 0x44 | 0x04 |
| 30 | 27.000 | 368 | 292[3] | 0xA5 | 0x38 |
| 15 | 27.000 | 556 | 324 | 0x76 | 0x30 |
| 10 | 27.000 | 656 | 412 | 0x5D | 0x1A |
| 7.5 | 27.000 | 892 | 404 | 0x22 | 0x1C |

[1]Nominal Frame Rate given. Desired frame rate is (30000/1001)/n, n = 1,2,3,4.
[2]292 is the minimum height due to Sync length requirements. This results in a frame rate of 26.3 Hz.
[3]292 is the minimum height due to Sync length requirements. This results in a frame rate of 25.1 Hz.

Operation of the pixel bus 82 will now be described in detail. As noted above, the VCPs 60 include video input and output sections for receiving and sending pixels from and to the pixel bus 82. The pixel bus controller 84 provides control signals to the video input and output sections of the VCPs 60 to enable connection to the pixel bus 82. The preferred embodiment of the pixel bus 82 provides five timeslots in which each VCP 60 in succession outputs video pixels. Any of the other VCPs 60 can simultaneously input pixels for compression processing. Each of the timeslots is delimited by the presence of a vertical sync signal. Within the timeslot, horizontal sync signals are programmed to provide horizontal scan intervals to the VCPs 60. The pixel bus controller 84 may typically be programmed to provide vertical syncs at a rate which is five times the nominal frame rate, e.g., VSYNC runs at 150 Hz such that all five VCP 60 are active, each at a 30 Hz rate.

Figure 15:
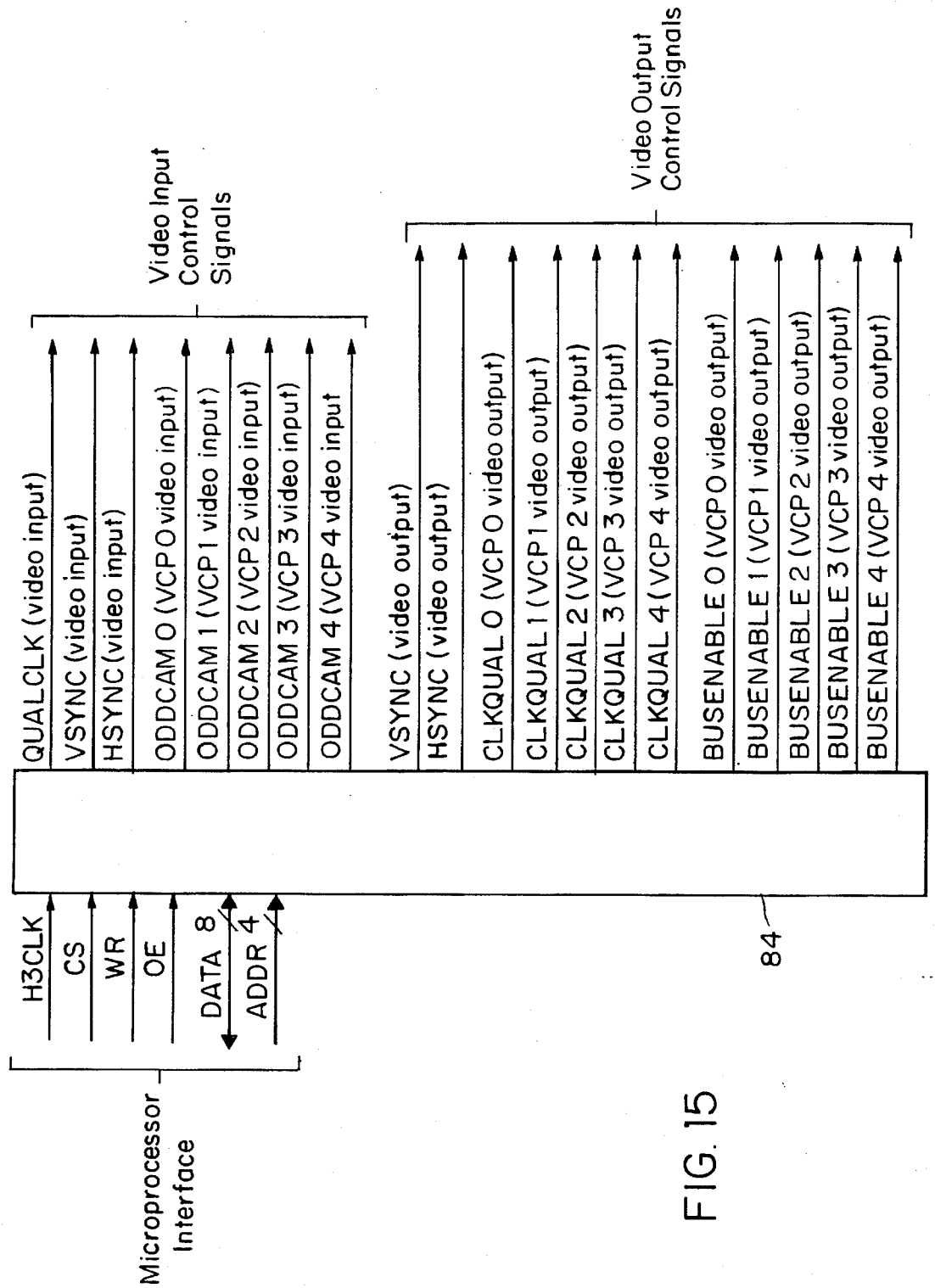
FIG. 15 is a schematic block diagram of the control signal interfaces of the pixel bus controller of the VPU of FIG. 12.

The pixel bus controller 84, which can be implemented with a field programmable gate array (FPGA), has three types of signals: microprocessor interface signals, video input control and video output control signals as shown in the block diagram of FIG. 15. The microprocessor control signals allow the VPU-CP 62 to set up the parameters of the pixel bus controller 84. For example, the internal hcnt and vcnt registers respectively holding the horizontal length and vertical length may be programmed by selecting the appropriate address enabling the chip select (CS), and pulsing the write strobe (WR). The internal registers may be read back by selecting the appropriate address, enabling the chip select (CS), and pulsing the read strobe (OE).

Video input control signals of the pixel bus controller 84 include the QUALCLK, HSYNC, VSYNC, and ODDCAM [0–4] signals. The QUALCLK or pixel clock qualifier signal runs at the pixel rate which is one-half of the 2 X pixel clock inputs to the VCPs 60. This signal is used to gate the 2 X pixel clocks to the VCPs 60, i.e., when this signal is true, the 2 X clock input is valid. This signal is common to all the VCP video input sections and runs continuously.

The HSYNC, or horizontal sync signal indicates the beginning of a scan line to the VCP video input section. This signal is common among all the VCP video input sections. The VSYNC, or vertical sync signal, indicates the start of an image scan to the VCP video input sections. This signal is also common among all the VCP video input sections.

The ODDCAM [0–4], or odd/even indicator signals, are provided individually to each VCP to enable the VCP video input section to only input data from the other VCPs and not from itself.

The control signals to the video output sections are HSYNC, VSYNC, CLKQUAL [0–4], and BUSENABLE [0–4] signals. The HSYNC and VSYNC signals are the same signals as used by the input sections. The CLKQUAL [0–4], or pixel clock qualifier signals are individual for each VCP 60 causing each VCP video output section to be active only during its respective pixel bus timeslot.

Since the VCP pixel output sections are always driving, tri-state output isolation buffers 67 (FIG. 17) are used to isolate the VCP video pixel outputs from the pixel bus 82. During each VCP pixel output timeslot, the BUSENABLE signal to the VCP 60 will enable only that VCP onto the pixel bus 82. Thus, the BUSENABLE signal enables the output of each output isolation buffer 67 onto the pixel bus 82.

Figure 16:
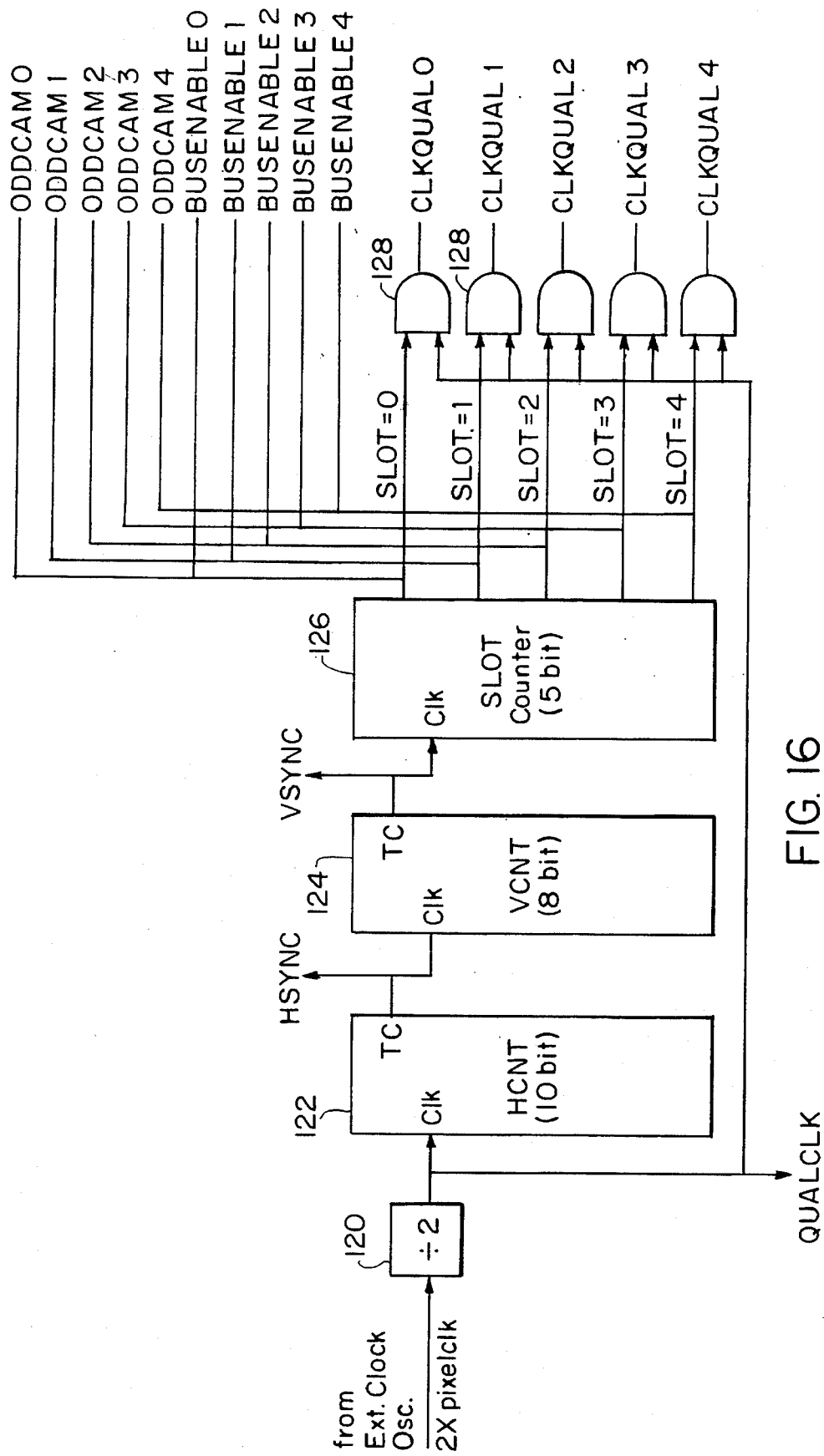
FIG. 16 is a schematic block diagram of the control logic of the pixel bus controller of FIG. 15.

The schematic diagram of the pixel bus controller control logic is shown in FIG. 16. To simplify the diagram, the microprocessor interface signals which are used to load count values are not shown. The VCP input and output sections normally operate with a clock input which is two times the pixel rate. This clock signal, 2XPIXELCLK, is provided both to the VCPs 60 and to the pixel bus controller 84 by an external clock oscillator. The 2XPIXELCLK is divided by two by divider block 120 to provide the source for the clock qualifier signals QUALCLK and CLKQUAL [0–4]. The QUALCLK output of divider block 120 provides the clock source for the horizontal pixel counter HCNT 122. HCNT 122 is programmed for the desired line length and counts once for each pixel time. The terminal count output (TC) of HCNT 122 provides the horizontal sync signal to all the VCP video input and output sections. HSYNC is also used as the clock input to the vertical line counter VCNT 124; thus, the vertical line counter counts once for each complete line of pixels. Vertical line counter VCNT 124 is programmed for the desired number of lines and counts once for each scan line. The terminal count (TC) of the vertical line counter is used as the vertical sync signal VSYNC to each of the VCP video input and output sections. VSYNC also provides the clock input to slot counter 126.

The slot counter 126 has five outputs, SLOT=0 through SLOT=4. Each output will be true in succession on each input clock pulse from VSYNC. These outputs are used to gate the pixel clock qualifier signal QUALCLK to each VCP when that VCP is in its active timeslot. Thus, the signals CLKQUAL [0–4] will each be active one at a time in succession. The signals SLOT=0 through SLOT=4 are provided externally as BUSENABLE 0 through BUSENABLE 4 to activate the video output isolation buffers 67 (FIG. 17) to the pixel bus 82. Similarly, the SLOT signals are provided externally as ODDCAM [0–4].

Figure 17:
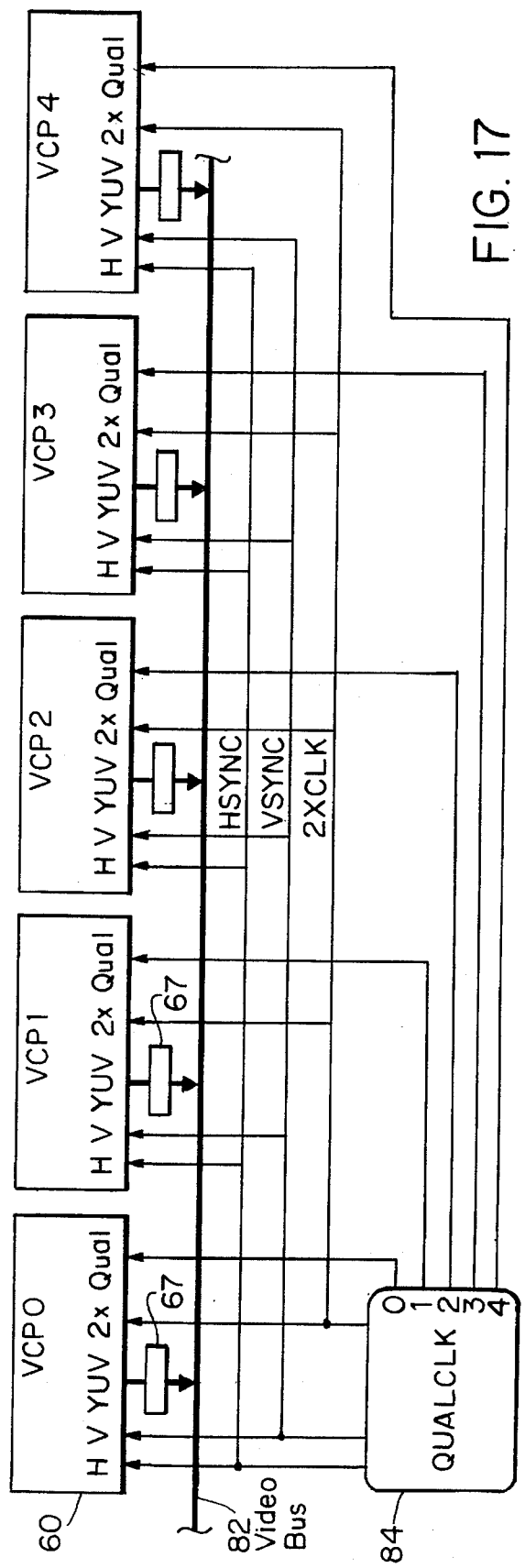
FIG. 17 is a schematic block diagram of the VCP output control arrangement.
Figure 18:
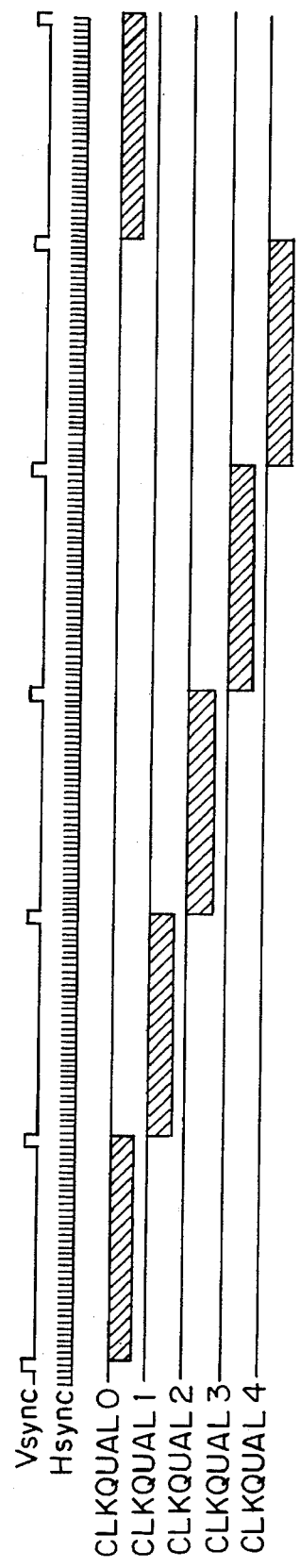
FIG. 18 is a timing diagram of the output control signals for the arrangement of FIG. 17.

The operation of the VCP output section will now be described. FIG. 17 is a block diagram which shows the interconnection of output control signals from the pixel bus controller 84 to the VCPs 60. FIG. 18 is a timing diagram illustrating the relationship among the control signals. As can be seen from the timing diagram, each of the CLKQUAL [0–4] signals is active only during its respective VCP video output timeslot on the pixel bus 82. When active, these signals run at the pixel rate which is one-half of the 2XPIXELCLK output.

Figure 19:
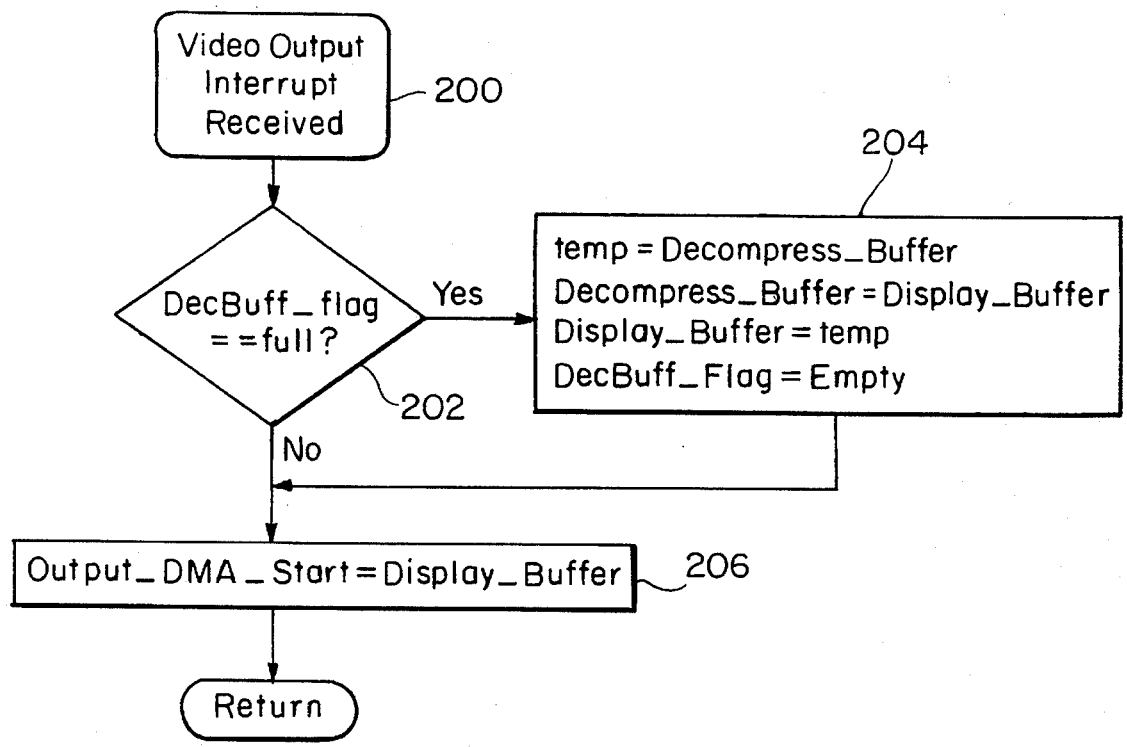
FIG. 19 is a flow chart of the output interrupt handler routine.

Each VCP 60 has its video output section programmed to cause an interrupt at the beginning of its active output timeslot, but prior to the active pixel region in that timeslot. A flow chart diagram of the video output interrupt handler is shown in FIG. 19. After a video output interrupt is received at program step 200, the program will next determine if a new buffer of decoded data is available at step 202. If there is new data available, the program will set up the DMA pointers to pull pixel data from the newly decoded data at step 204. If there is not a complete buffer of new decoded data available, the DMA pointer will be set to redisplay the old pixel data at step 206. Step 204 indicates that a double buffering scheme is used such that the video decoder is not filling the same buffer which is being displayed.

Figure 20:
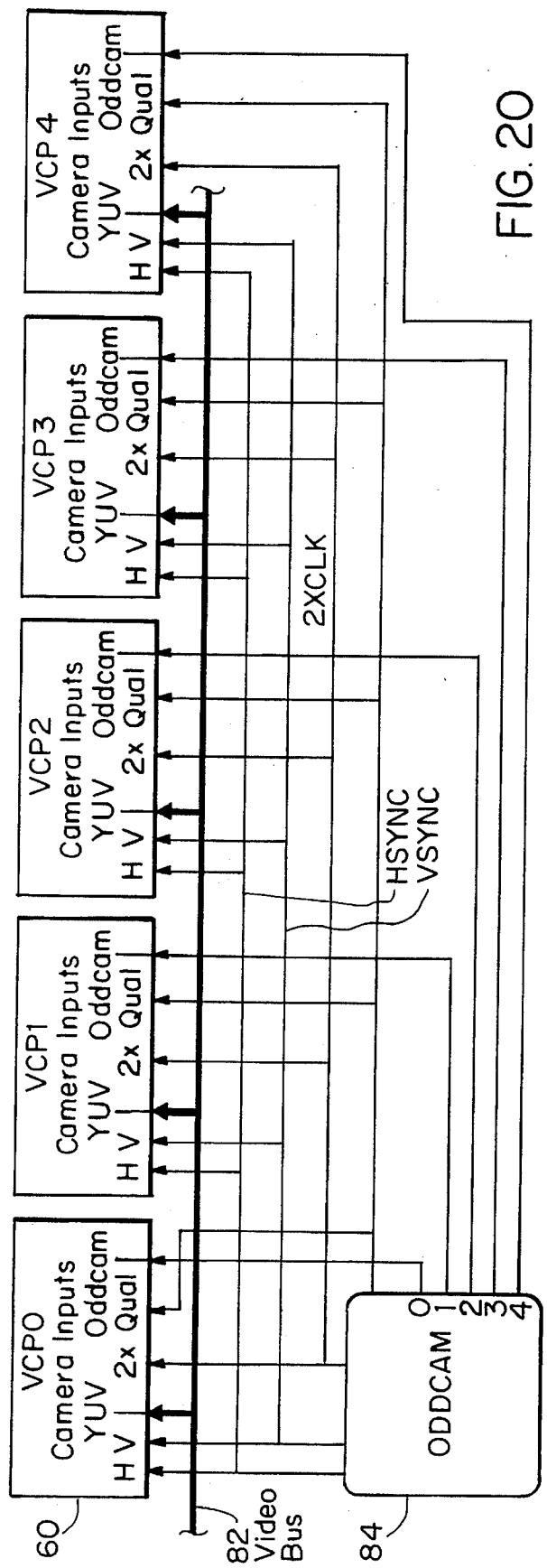
FIG. 20 is a schematic block diagram of the VCP input control arrangement.
Figure 21:
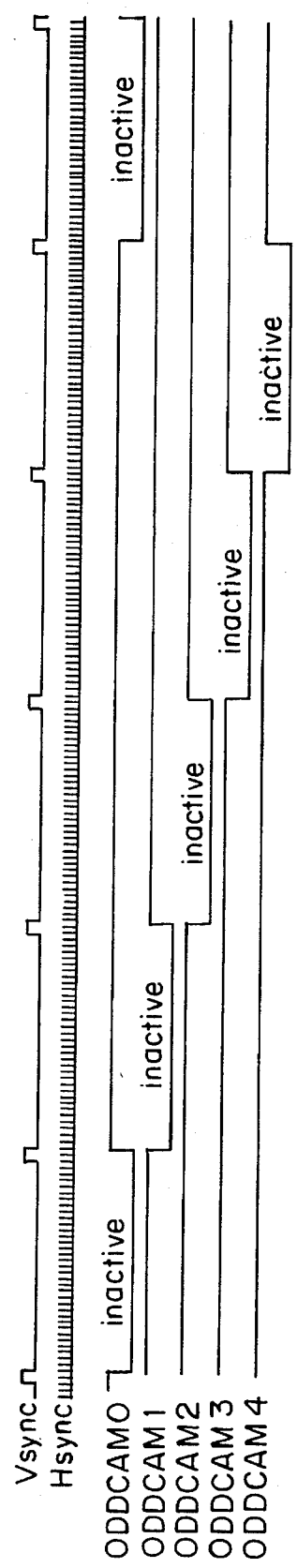
FIG. 21 is a timing diagram of the input control signals for the arrangement of FIG. 20.

The operation of the video input section will be described now. FIG. 20 shows the interconnection of input control signals from the pixel bus controller 84 to the VCPs 60. In FIG. 21, the timing diagram indicates the relationship among the video input control signals. When a particular ODDCAM signal is at logic 0, its associated VCP 60 is active in its own timeslot of the pixel bus, i.e., that VCP would be outputting data onto the pixel bus 82. When the signal is a logic 1, one of the other VCPs is outputting data onto the pixel bus 82. By programming the VCP video input section to only input when ODDCAM=1, then the VCP will only input data from other devices and not from itself.

Figure 22:
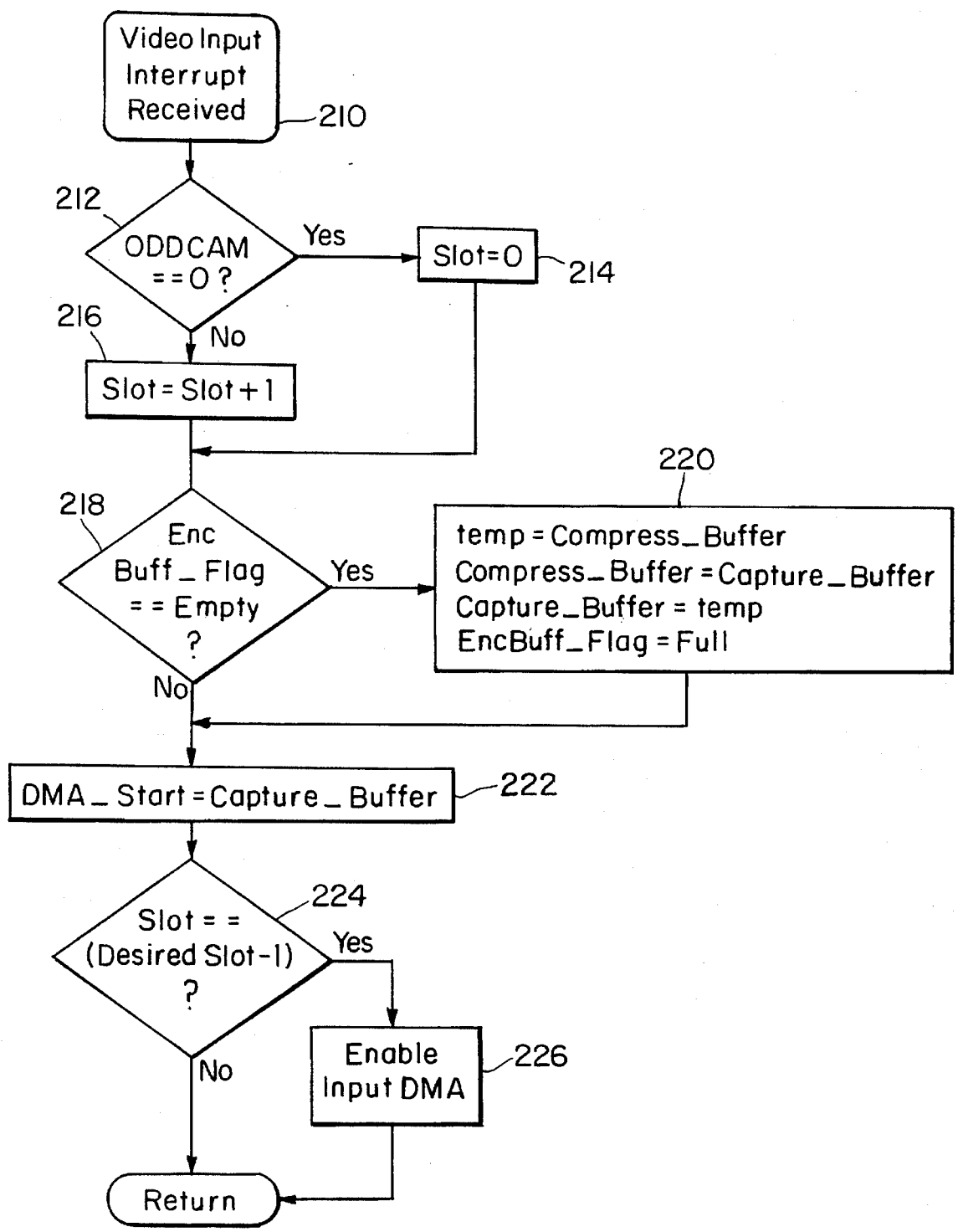
FIG. 22 is a flow chart of the input interrupt handler routine for transcoding applications.

The video input section of the VCP 60 is programmed to provide an interrupt at the end of each scan. The operation of the interrupt handler for transcoding applications is shown in the program flow chart of FIG. 22. When an interrupt is received at step 210, the ODDCAM signal is checked at 212 to determine if the current timeslot is the particular VCP's timeslot. The slot counter is reset to zero at 214 when ODDCAM is zero, indicating that the current timeslot belongs to the VCP. Otherwise, the slot counter is incremented by one at 216. Next, the handler checks at 218 to see if there is an empty buffer available. If there is an empty buffer, the handler swaps to the new buffer at step 220. The input DMA is then set up to put the pixel data located in the buffer into memory at step 222. Finally, the slot counter is checked at 224 to determine whether the next timeslot is the desired timeslot to be captured. The desired timeslot designation is programmed into the VCP 60. Thus, the VCP 60 is programmed to perform a selector function to select among the possible input timeslots. If the next timeslot is the desired timeslot, then the DMA is enabled at 226 and will become active on the next vertical sync, capturing the pixel data from the next buffer.

Figure 23:
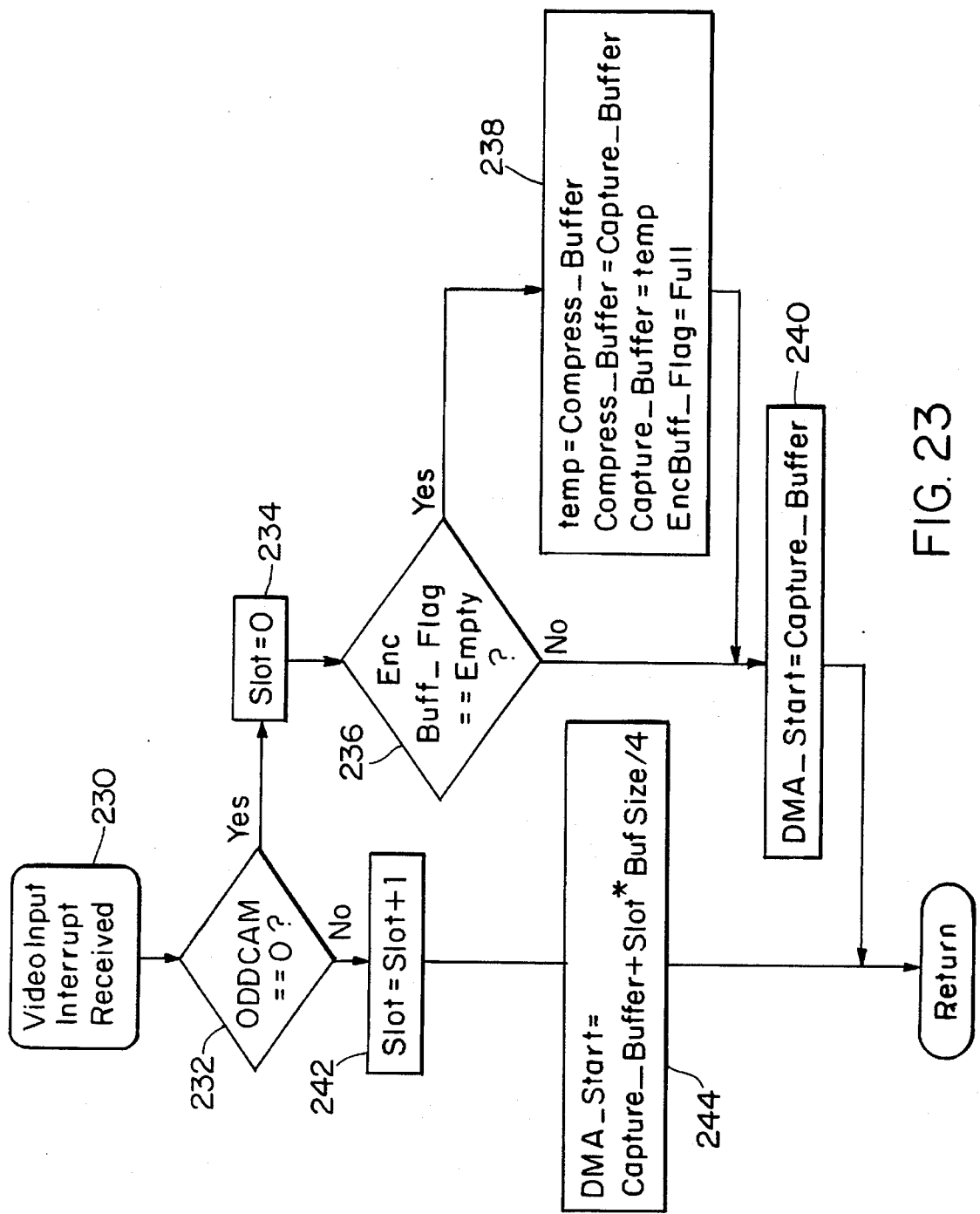
FIG. 23 is a flow chart of the input interrupt handler routine for continuous presence applications.

For applications of continuous presence, or spatial mixing, the video interrupt handler operates similarly except that the input DMA needs to be setup to put pixel data into different regions of memory in order to achieve spatial mixing of the images input during the other VCP timeslots. This interrupt handler is shown in the program flow chart of FIG. 23.

When an interrupt is received at step 230, the ODDCAM signal is checked at 232 to determine if the current timeslot is the particular VCP's timeslot. The slot counter is reset to zero at 234 when ODDCAM is zero, indicating that the current timeslot is the timeslot of the particular VCP. Next, the handler checks at 236 to see if there is an empty buffer available. If there is an empty buffer available, the handler swaps to the new buffer at 238. The input DMA is then set up to put buffer contents into memory at 240. When ODDCAM is not zero, the slot counter is instead incremented by one at 242. The input DMA is also set up to place buffer contents into memory at a region based on the slot counter value at 244.

Figure 24:
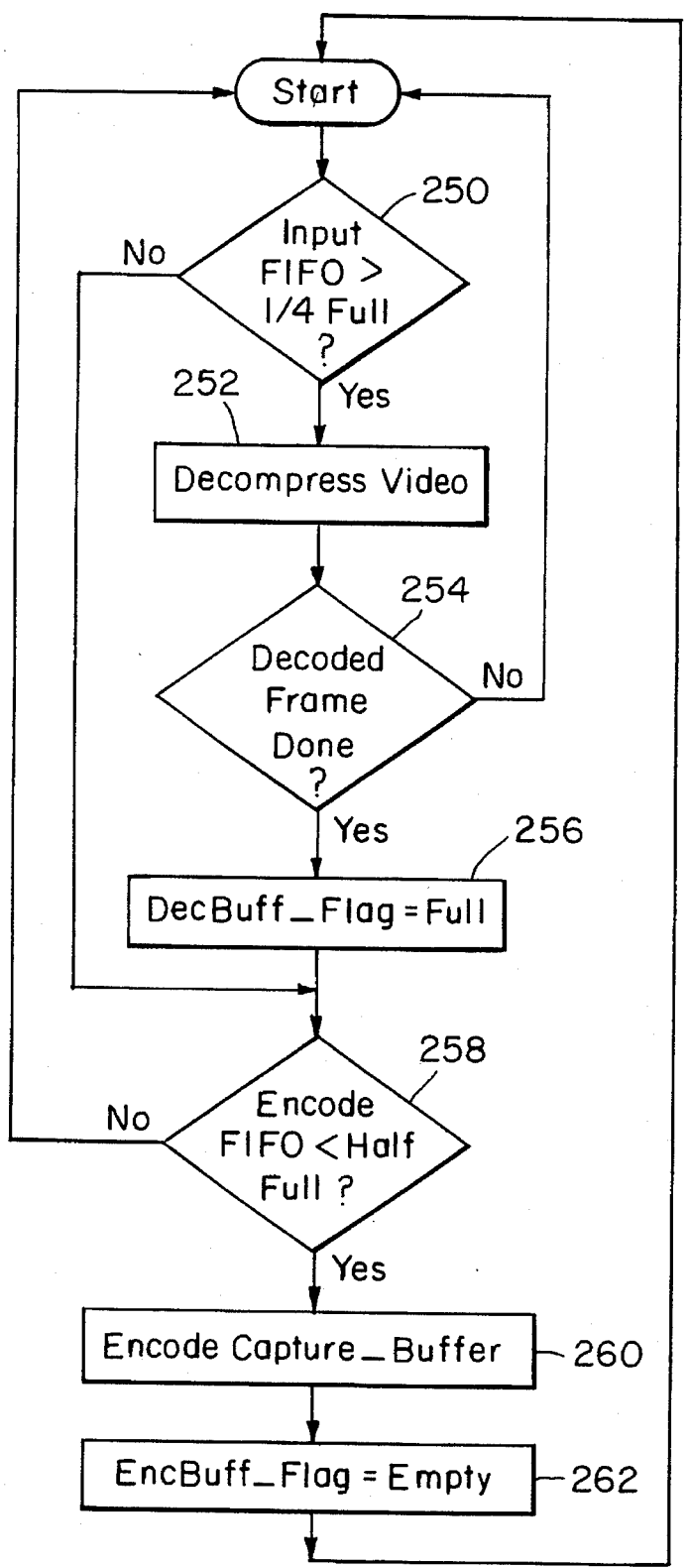
FIG. 24 is a flow chart of the main program for codec operation in the VCPs.

The main program task in each VCP 60 runs a video codec loop as shown in the program flow chart of FIG. 24. Flags are used to communicate with the interrupt handler routines (described above) to indicate if a decoded buffer has been generated or if a buffer is ready to be encoded.

If there is sufficient compressed video data in the input FIFO at step 250, then decompression begins at step 252. This continues through loop 254 until a complete frame is decoded. When the frame is decoded, a flag is set at 256 to indicate to the output video interrupt handler that the decoded buffer is ready. If there was not sufficient data in the input FIFO, then the encode routine is called at step 258.

The encode FIFO is checked at 258 to see if there is sufficient room for the encoded video stream. If there is, the captured pixel data buffer is compressed at 260, the encode buffer flag is reset at 262, and then the program flow returns to the beginning of the loop. If there is not sufficient room in the encode compressed data FIFO, then the program goes to the beginning of the loop without encoding a new frame.

Having described an embodiment of the digital transcoding of the present invention, the aspect of the invention that reduces the computation time for the encoding operation in video transcoding of motion compensation based algorithms will now be described.

One of the drawbacks of transcoding for conferencing is the deleterious effect on natural conversational flow due to total system delays. A significant portion of the encoding time to perform motion compensation based video compression algorithms is due to the motion displacement search. It is desirable to reduce the time necessary for the motion displacement search.

Motion compensation is a technique used often in video compression algorithms, such as H.261, MPEG, and Indeo. This technique is used to reduce the amount of information needed to represent images in a video sequence, by utilizing the fact that the content of successive frames in a video sequence have significant areas of similar content which may be translated spatially between successive frames. An estimate of the next frame is created using information in the previous frame or frames, along with displacement information.

Typically, each image frame is encoded as blocks of pixels, such as 8×8, 16×16, etc. For each of these blocks, a displacement vector indicates a corresponding block in the previous frame which can be translated spatially to form an estimate of the current block of pixels. The displacement information is usually represented as a field of vectors, each having a horizontal and vertical displacement.

A motion estimation method is used to create the vector field of displacement estimates, based on pixels in the current and previous frame or frames. The motion estimation might be implemented using any of the known methods, such as pattern matching, pel recursive, or transform domain techniques.

A typical motion estimation technique used is pattern matching. In this method, each block of interest in the current frame is compared to blocks in the previous frame or frames. A difference metric of the pixels in the block from the current frame versus the block in the previous frame Is calculated. This is tried over some limited range of displacements (e.g., an area of 15 pixels horizontally by 15 pixels vertically) in the previous frame, and the displacement which had the lowest difference value is used as the displacement estimate. The difference metric method might be the sum of absolute values of the differences between pixels, or the sum of the squared differences. The block matching search is typically performed over the full image, comparing all of the possible blocks within the displacement range limits.

In general and described further below, motion information received by a decoder as part of a normal decoding operation is passed to an encoder after appropriate filtering and scaling and reordering if necessary.

These motion vectors may, in some cases, be used directly by the encoder, allowing the encoder to skip the motion estimation step, significantly reducing computations. The vector fields could be used directly in cases where the block sizes of the decoded image and encoded image are the same, such as a rate matching application for H.320 terminals.

The motion vector field could also be used as a seed for a further displacement estimate. The continued displacement search could then be over a more limited area thus reducing computations. For example, in H.261, the displacement can range over an area of +/−15 pixels. By starting the search at the displacement given by the corresponding vector from the decoder, the search area might now be limited to +/−3 pixels, reducing the motion estimation search computations by 96%.

In other cases, the motion vectors from the decoder would need to be processed before being used by the encoder. For instance, in video algorithm transcoding from one algorithm (algorithm H) using a spatial resolution of 352×288 pixels to another (algorithm I) using 320×240 pixels requires 1.1:1 pixel scaling horizontally and 1.2:1 pixel scaling vertically. If the two algorithms use the same pixel block sizes, then the vector fields would be scaled (decimated) by the same factors as the pixel images.

If the two algorithms use unlike block sizes, the vector fields would be scaled by different factors than the pixel images. If in the above example, algorithm H uses 16×16 blocks for motion compensation, and algorithm I uses 8×8 blocks for motion compensation, then algorithm H would use a 22×18 entry vector field, while algorithm I would use a 40×36 entry vector field. In this case, the 22×18 vector field from the decoder would need to be interpolated to 40×36 before being used by the encoder.

As a further example, algorithm H might use single pixel accuracy for the displacement estimation, while algorithm I might use half pixel displacement estimates, in which case, the single pixel format would need to be converted to a fractional representation.

Another example reuses the vector fields from the decoders in a continuous presence application. In continuous presence, multiple images are scaled and tiled into a single image, then re-encoded. Consider the simple example of continuous presence with a mix of four images scaled by one half horizontally and vertically, tiled into a single (full size) image and re-encoded. The vector fields would also be scaled by one half horizontally and vertically, tiled in the same order as the corresponding pixel frames into a single vector field, then reused by the encoder.

Again, the scaled vector fields might be used directly, or as a seed for further estimation over a reduced search area, significantly reducing computations for the encoder's motion estimation. These techniques are applicable to algorithms which might use motion estimation techniques other than block matching, as long as the vector fields are processed to the format used by the encoder.

Figure 25:
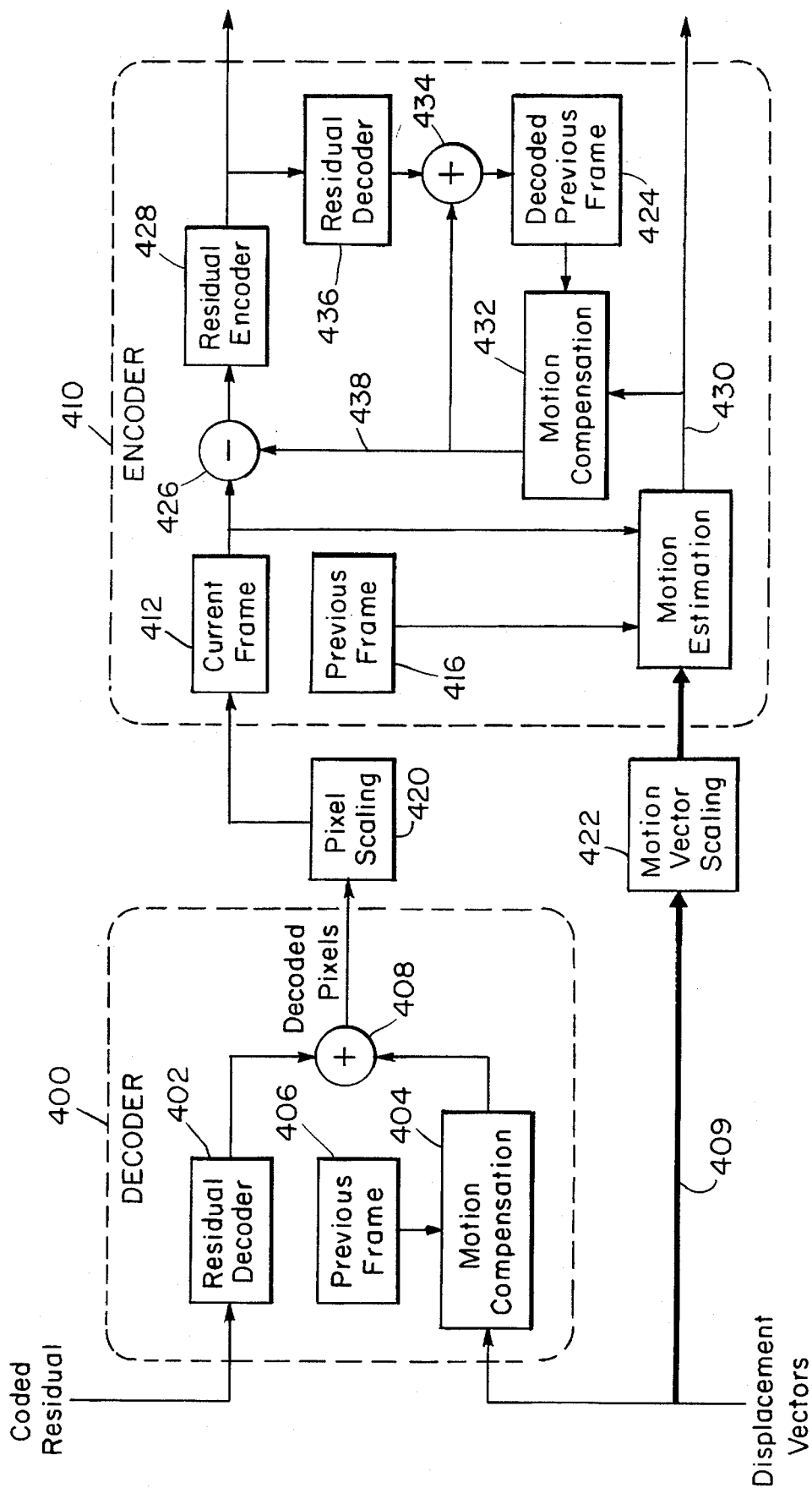
FIG. 25 is a block diagram illustrating reuse of motion compensation information by an encoder.

FIG. 25 is a block diagram illustrating the reuse of motion compensation information by an encoder. A typical motion compensation based video decoder 400 and encoder 410 are shown. In the decoder 400, residual (difference) information is presented to a residual decoder 402 to produce decoded residuals. Displacement vectors presented to motion compensation block 404 are used together with a previously decoded frame or frames 406 to determine an estimate of the current frame. This estimated current frame information is combined at 408 with the decoded residuals to form a decompressed image.

In the typical encoder 410, the current frame 412 is a new image frame input into the encoder. The current frame 412 and a previous frame or frames 416 are used to make an estimate of the motion displacement between images. The displacement information 430 is used by the motion compensation 432 to create an estimate 438 of the current frame, using the decoded previous frame 424. The difference (residual) from the current frame and its estimate is calculated at 426 and is encoded by the residual encoder 428 (usually with a lossy method such as discrete cosine transform and quantization). The decoded previous frame 424 is calculated by decoding the residual at 436 and summing with the estimated pixels at 434.

In accordance with the present invention, video transcoding between decoder 400 and encoder 410 is improved by making use of the displacement vectors from the decoder in the encoding process. Specifically, displacement vectors are received by the encoder 410 from decoder 400 over a path 409. The displacement vectors are passed into the motion estimation block 414 of the encoder 410 to be used either directly or as a seed for a further displacement estimate in the encoding process. A pixel scaling block 420 provides pixel scaling between algorithms having different spatial resolutions. A motion vector scaling block 422 provides scaling or reformatting of the displacement vectors between algorithms which have unlike pixel block sizes or image formats.

Note that the transcoding described herein is performed in the pixel domain. By performing transcoding in the pixel domain, a wider range of compression algorithms can be accommodated, including algorithms not based on transform techniques. However, the transcoding can also be performed in the transform domain in such cases where the algorithms are transform-based.

In terms of the video transcoding embodiment described earlier, the video decoder 400 and the video encoder 410 can be separate decoder 102-i and encoder 106-j respectively (FIG. 5).

The decompressed image produced at 408 in FIG. 25 can be placed onto the pixel bus 82 (FIG. 5) to be input and encoded by encoder 410. The displacement vectors can be passed from decoder 400 to encoder 410 over a bus such as the PK bus 80 (FIG. 11).

Equivalents

While this invention has been particularly shown and described with references to preferred embodiments thereof, it will be understood by those skilled in the art that various changes in form and details may be made therein without departing from the spirit and scope of the invention as defined by the appended claims. For example, though implemented to a large extent using programmable special purpose video devices, the novel functions of the VCP can be performed by embodiments implemented fully in nonprogrammable hardware designed specifically to the disclosed functions as well as fully implemented in a programmed general purpose computer. However, nonprogrammable hardware lacks flexibility and programmed general purpose hardware lacks speed.

What is claimed is:

1. A multipoint control unit for receiving compressed video signals from terminals in a conference and for transmitting selected compressed video signals to the terminals, the multipoint control unit comprising:

decoding means for decoding the compressed video signals from respective terminals to uncompressed video signals in a pixel domain;

a time division multiplex bus receiving the uncompressed video signals at timeslots associated with respective terminals, the bus being a parallel pixel bus;

selector means for selecting the uncompressed video signals from one or more timeslots of the time division multiplex bus; and encoding means for encoding the selected uncompressed video signals for transmission to respective terminals.

2. The multipoint control unit of claim 1 wherein the decoding and encoding means include different compression algorithms matching compression algorithms of respective terminals.

3. The multipoint control unit of claim 1 wherein the decoding and encoding means operate at data rates matching respective terminals such that terminals having different data rates can intercommunicate in the conference.

4. The multipoint control unit of claim 1 wherein the encoding means encodes the selected uncompressed video signals from plural timeslots to form composite encoded video signals.

5. The multipoint control unit of claim 1 further comprising scaling means for scaling the uncompressed video signals to a desirable resolution.

6. The multipoint control unit of claim 1 wherein the encoding means receives motion displacement vectors associated with the selected uncompressed video signals for motion estimation.

7. A multipoint control unit for receiving compressed video signals from terminals in a conference and for transmitting selected compressed video signals to the terminals, the multipoint control unit comprising:

decoding means for decoding the compressed video signals from respective terminals to uncompressed video signals in a pixel domain;

scaling means for scaling the uncompressed video signals to a desirable resolution;

a time division multiplex bus receiving the uncompressed video signals at timeslots associated with respective terminals, the bus being a parallel pixel bus;

selector means for selecting the uncompressed video signals from one or more timeslots of the time division multiplex bus; and encoding means for encoding the selected uncompressed video signals from plural timeslots to form composite encoded video signals for transmission to respective terminals;

the decoding and encoding means including different compression algorithms matching compression algorithms of respective terminals;

the decoding and encoding means operating at data rates matching respective terminals such that terminals having different data rates can intercommunicate in the conference.

8. A multipoint control unit for receiving compressed video signals from terminals in a conference and for transmitting selected compressed video signals to the terminals, the multipoint control unit comprising:

a first time division multiplex bus having timeslots for transporting compressed video signals and audio signals;

at least one bridge processor coupled to the first time division multiplex bus for placing compressed video signals and audio signals from respective terminals into timeslots of the first time division multiplex bus;

decoding means for decoding compressed video signals received from timeslots of the first time division multiplex bus;

a second time division multiplex bus receiving the decoded video signals at timeslots associated with respective terminals;

selector means for selecting the decoded video signals from one or more timeslots of the second time division multiplex bus; and encoding means for encoding the selected decoded video signals and for applying the encoded video signals to the first time division multiplex bus;

at least one bridge processor receiving the selected encoded video signals and audio signals from the first time division multiplex bus for transmission to the respective terminals.

9. The multipoint control unit of claim 8 further comprising scaling the means for scaling decoded video signals to a desirable resolution and wherein the encoding means encodes the selected decoded video signals from plural timeslots to form composite encoded video signals, the decoding and encoding means include different compression algorithms matching compression algorithms of respective terminals, and the decoding and encoding means operate at data rates matching the respective terminals such that terminals having different data rates can intercommunicate in the conference.

10. The multipoint control unit of claim 8 wherein audio signals received by at least one bridge processor are delayed a sufficient amount to compensate for encoding and decoding of video signals.

11. The multipoint control unit of claim 8 wherein the encoding means receives motion displacement vectors associated with the selected decoded video signals for motion estimation.

12. In a video teleconferencing system in which a plurality of audiovisual terminals operable to send and receive compressed digital video signals communicate with each other through a multipoint control unit having a video processing unit, the video processing unit comprising:

a pixel bus having a plurality of timeslots for transporting uncompressed digital video signals;

a pixel bus controller for controlling access to the pixel bus; and a plurality of processors, each processor coupled to the pixel bus and associated with at least one timeslot; each processor assignable to a respective audiovisual terminal participating in the conference;

each processor comprising:

means for receiving first compressed digital video signals from an audiovisual terminal assigned to the processor;

means for decoding the first compressed digital video signals to first uncompressed digital video signals;

means for scaling the first uncompressed digital video signals to a desirable resolution;

means for inserting the first uncompressed digital video signals into the at least one associated timeslot on the pixel bus when an output control signal is received from the pixel bus controller;

means for receiving second uncompressed digital video signals from any timeslot associated with any processor when an input control signal is received from the pixel bus controller;

means for scaling the second uncompressed digital video signals to a desirable resolution;

means for encoding the second uncompressed digital video signals to second compressed digital video signals; and means for transmitting the second compressed digital video signals to the audiovisual terminal assigned to the processor.

13. The video processing unit of claim 12 wherein the decoding means and the encoding means comprise a coding algorithm, the coding algorithm for a respective processor matching a terminal coding algorithm for a respective assigned audiovisual terminal and optionally differing from the coding algorithms of other processors in the conference, such that the conference comprises audiovisual terminals having optionally different terminal coding algorithms.

14. The video processing unit of claim 12 wherein a respective assigned audiovisual terminal sends and receives compressed digital video signals at a transmission rate that optionally differs from the transmission rate of other audiovisual terminals in the conference.

15. The video processing unit of claim 12 wherein a respective processor further comprises means for spatially mixing a plurality of second uncompressed digital video signals received from the pixel bus to form a composite uncompressed digital video signal for encoding and transmission by the encoding and transmitting means of the respective processor.

16. A video teleconferencing system comprising:

a plurality of audiovisual terminals, each audiovisual terminal operable to send and receive compressed digital video signals; and a multipoint control unit for allowing the plurality of audiovisual terminals to communicate with each other in a conference, having a video processing unit, the video processing unit comprising:
    a pixel bus having a plurality of timeslots for transporting uncompressed digital video signals;
    a pixel bus controller for controlling access to the pixel bus; and
    a plurality of processors, each processor coupled to the pixel bus and associated with at least one timeslot; each processor assignable to a respective audiovisual terminal participating in the conference;
    each processor comprising:
        means for receiving first compressed digital video signals from an audiovisual terminal assigned to the processor;
        means for decoding the first compressed digital video signals to first uncompressed digital video signals;
        means for scaling the first uncompressed digital video signals to a desirable resolution;
        means for inserting the first uncompressed digital video signals into the at least one associated timeslot on the pixel bus when an output control signal is received from the pixel bus controller;
        means for receiving second uncompressed digital video signals from any timeslot associated with any processor when an input control signal is received from the pixel bus controller;
        means for scaling the second uncompressed digital video signals to a desirable resolution;
        means for encoding the second uncompressed digital video signals to second compressed digital video signals; and
        means for transmitting the second compressed digital video signals to the audiovisual terminal assigned to the processor.

17. The video teleconferencing system of claim 16 wherein the decoding means and the encoding means comprise a coding algorithm, the coding algorithm for a respective processor matching a terminal coding algorithm for a respective assigned audiovisual terminal and optionally differing from the coding algorithms of other processors in the conference, such that the conference comprises audiovisual terminals having optionally different terminal coding algorithms.

18. The video teleconferencing system of claim 16 wherein a respective assigned audiovisual terminal sends and receives compressed digital video signals at a transmission rate that optionally differs from the transmission rate of other audiovisual terminals in the conference.

19. The video teleconferencing system of claim 16 wherein a respective processor further comprises means for spatially mixing a plurality of second uncompressed digital video signals received from the pixel bus to form a composite uncompressed digital video signal for encoding and transmission by the encoding and transmitting means of the respective processor.

20. A video teleconferencing system comprising:
    a plurality of audiovisual terminals, each audiovisual terminal operable to send and receive compressed digital video signals; and
    a multipoint control unit for allowing the plurality of audiovisual terminals to communicate with each other in a conference, having a video processing unit, the video processing unit comprising:
        a plurality of processors, each processor assignable to a respective audiovisual terminal participating in the conference;
    each processor comprising:
        means for receiving first compressed digital video signals from an audiovisual terminal assigned to the processor;
        means for decoding the first compressed digital video signals to first uncompressed digital video signals;
        means for scaling the first uncompressed digital video signals to a desirable resolution;
        means for sending the first uncompressed digital video signals to any other processor;
        means for receiving second uncompressed digital video signals from any processor;
        means for scaling the second uncompressed digital video signals to a desirable resolution;
        means for encoding the second uncompressed digital video signals to second compressed digital video signals; and
        means for transmitting the second compressed digital video signals to the audiovisual terminal assigned to the processor;
        wherein the decoding means and the encoding means comprise a coding algorithm, the coding algorithm for a respective processor matching a terminal coding algorithm for a respective assigned audiovisual terminal and differing from the coding algorithms of other processors in the conference, such that the conference comprises audiovisual terminals having different terminal coding algorithms.

21. The video teleconferencing system of claim 20 wherein a respective processor further comprises means for spatially mixing a plurality of second uncompressed digital video signals to form a composite uncompressed digital video signal for encoding and transmission by the encoding and transmitting means of the respective processor.

22. A video teleconferencing system comprising:
    a plurality of audiovisual terminals, each audiovisual terminal operable to send and receive compressed digital video signals at a transmission rate that differs from the transmission rate of other audiovisual terminals in a conference; and
    a multipoint control unit for allowing the plurality of audiovisual terminals to communicate with each other in the conference, having a video processing unit, the video processing unit comprising:
        a plurality of processors, each processor assignable to a respective audiovisual terminal participating in the conference;
    each processor comprising:
        means for receiving first compressed digital video signals from an audiovisual terminal assigned to the processor;
        means for decoding the first compressed digital video signals to first uncompressed digital video signals;
        means for scaling the first uncompressed digital video signals to a desirable resolution;
        means for sending the first uncompressed digital video signals to any other processor;
        means for receiving second uncompressed digital video signals from any processor;
        means for scaling the second uncompressed digital video signals to a desirable resolution;
        means for spatially mixing a plurality of second uncompressed digital video signals to form a composite uncompressed digital video signal;
        means for encoding the composite uncompressed digital video signal to a composite compressed digital video signal; and means for transmitting the composite compressed digital video signal to the audiovisual terminal assigned to the processor.

23. A video teleconferencing system comprising:
  a plurality of audiovisual terminals, each audiovisual terminal operable to send and receive compressed digital data signals having a line framing format; and
  a multipoint control unit (MCU) for allowing the plurality of audiovisual terminals to communicate with each other in a conference, comprising:
    (a) a network interface bus for transporting compressed digital data signals having an internal MCU framing format;
    (b) at least one network interface unit, coupled to at least one respective audiovisual terminal and to the network interface bus, for reformatting compressed digital data signals in the line framing format to the internal MCU framing format for multiplexing onto the network interface bus, and for reformatting compressed digital data signals in the internal MCU framing format to the line framing format for transmitting to the respective audiovisual terminal;
    (c) an interprocessor bus having timeslots for transporting compressed digital video signals and compressed digital audio signals;
    (d) at least one bridge processing unit coupled to the network interface bus and to the interprocessor bus, and demultiplexing compressed digital data signals from the network interface bus, the at least one bridge processing unit including digital signal processing partitions, each partition assignable to a respective audiovisual terminal participating in the conference, each partition decoding compressed audio signals from its respective terminal and placing the decoded audio signals into timeslots on the interprocessor bus, each partition placing compressed video signals from its respective terminal into timeslots on the interprocessor bus, each partition selecting compressed video signals and at least one audio signal from appropriate timeslots on the interprocessor bus, each partition compressing the selected audio signals, the at least one bridge processing unit multiplexing the selected compressed audio signals and video signals for placing on the network interface bus; and
    (e) a video processing unit, the video processing unit comprising:
      a pixel bus having a plurality of timeslots for transporting uncompressed digital video signals;
      a pixel bus controller for controlling access to the pixel bus; and
  a plurality of processors, each processor coupled to the pixel bus and associated with at least one timeslot; each processor assignable to a respective audiovisual terminal participating in the conference;
  each processor comprising:
    means for receiving from the interprocessor bus first compressed digital video signals from an audiovisual terminal assigned to the processor;
    means for decoding the first compressed digital video signals to first uncompressed digital video signals;
    means for scaling the first uncompressed digital video signals to a desirable resolution;
    means for inserting the first uncompressed digital video signals into the at least one associated timeslot on the pixel bus when an output control signal is received from the pixel bus controller;
    means for receiving second uncompressed digital video signals from any timeslot associated with any processor when an input control signal is received from the pixel bus controller;
    means for optionally scaling the second uncompressed digital video signals to a desirable resolution;
    means for encoding the second uncompressed digital video signals to second compressed digital video signals; and
    means for transmitting to the interprocessor bus the second compressed digital video signals to the audiovisual terminal assigned to the processor.

24. In a multipoint control unit for receiving compressed video signals from terminals in a conference and for transmitting selected compressed video signals to the terminals, the method comprising the steps of:
  decoding the compressed video signals from respective terminals to uncompressed video signals;
  making the uncompressed video signals available at the respective maximum data rate of each uncompressed signal on a time division multiplex bus;
  selecting plural uncompressed video signals from the time division multiplex bus for a receiving terminal; and
  encoding the selected plural uncompressed video signals in a composite image for transmission to the receiving terminal at a data rate determined by the receiving terminal such that the receiving terminal receives each video signal in the composite image at maximum available image resolution.

25. In a multipoint control unit for receiving compressed video signals from terminals in a conference and for transmitting selected compressed video signals to the terminals, the method comprising the steps of:
  decoding the compressed video signals from respective terminals to uncompressed video signals in a pixel domain;
  receiving the uncompressed video signals on a time division multiplex bus having timeslots associated with respective terminals, the bus being a parallel pixel bus;
  selecting uncompressed video signals from one or more timeslots of the time division multiplex bus; and
  encoding the selected uncompressed video signals for transmission to respective terminals.

26. The method of claim 25 wherein the steps of decoding and encoding include using different compression algorithms matching compression algorithms of respective terminals.

27. The method of claim 25 wherein the steps of decoding and encoding further include operating at data rates matching respective terminals such that terminals having different data rates can intercommunicate in the conference.

28. The method of claim 25 wherein the step of encoding further includes selecting the uncompressed video signals from plural timeslots to form composite encoded video signals.

29. The method of claim 25 further comprising the step of scaling the uncompressed video signals to a desirable resolution.

30. In a multipoint control unit through which a plurality of audiovisual terminals operable to send and receive compressed video signals intercommunicate, apparatus for reusing motion displacement vectors located within the compressed video signals comprising:
  a decoder for decoding the compressed video signals from respective terminals to uncompressed video signals in a pixel domain;

a time division multiplex bus for receiving the uncompressed video signals at timeslots associated with respective terminals;

selector means for selecting the uncompressed video signals from one or more timeslots of the time division multiplex bus; and an encoder for encoding the selected uncompressed video signals for transmission to the respective terminals, the encoder receiving motion displacement vectors associated with the compressed video signals from the decoder for motion estimation.

31. The apparatus of claim 30 further comprising a scaler for scaling the motion displacement vectors prior to encoding.

* * * * *